(12) United States Patent
Schmid

(10) Patent No.: US 12,242,873 B2
(45) Date of Patent: Mar. 4, 2025

(54) SECURE DEPLOYMENT AND OPERATION OF A VIRTUAL PLATFORM SYSTEM

(71) Applicant: NAGRAVISION S.A., Cheseaux-sur-Lausanne (CH)

(72) Inventor: Christophe Schmid, Cheseaux-sur-Lausanne (CH)

(73) Assignee: NAGRAVISION S.A., Cheseaux-sur-Lausanne (CH)

( * ) Notice: Subject to any disclaimer, the term of this patent is extended or adjusted under 35 U.S.C. 154(b) by 425 days.

(21) Appl. No.: 17/298,980

(22) PCT Filed: Dec. 3, 2019

(86) PCT No.: PCT/EP2019/083548
§ 371 (c)(1),
(2) Date: Jun. 2, 2021

(87) PCT Pub. No.: WO2020/115073
PCT Pub. Date: Jun. 11, 2020

(65) Prior Publication Data
US 2022/0067147 A1    Mar. 3, 2022

(30) Foreign Application Priority Data
Dec. 3, 2018 (EP) .................................. 18209913

(51) Int. Cl.
*G06F 9/455* (2018.01)
*G06F 21/50* (2013.01)
(Continued)

(52) U.S. Cl.
CPC .......... *G06F 9/45558* (2013.01); *G06F 9/455* (2013.01); *G06F 9/45504* (2013.01);
(Continued)

(58) Field of Classification Search
CPC .. G06F 9/455; G06F 9/45504; G06F 9/45558; G06F 2009/455; G06F 2009/79;
(Continued)

(56) References Cited

U.S. PATENT DOCUMENTS 8,626,681 B1 * 1/2014 Jurca ..................... G06F 40/232
706/12
9,697,027 B1 * 7/2017 Hazra ....................... G06F 9/50
(Continued)

FOREIGN PATENT DOCUMENTS

EP    3122082 A1    1/2017
EP    3185168 A1    6/2017

OTHER PUBLICATIONS

Brauckhoff et al., "Impact of Packet Sampling on Anomaly Detection Metrics", IMC'06, Oct. 25-27, 2006, Rio de Janeiro, Brazil, ACM, pp. 159-164 (Year: 2006).*

*Primary Examiner* — Charles M Swift
(74) *Attorney, Agent, or Firm* — POLSINELLI LLP

(57) ABSTRACT

Virtual platform system for use in a cloud-based system, comprising: a virtual platform simulator configured to represent in software a physical remote client device and to have this representation interact with a virtual platform application; a process virtual machine configured to execute program instructions of the virtual platform application and comprising a code morpher component for transforming the program instructions of the virtual platform application into native program instructions for execution on a physical host machine of the cloud-based system; and interception components for capturing transactions from the virtual platform simulator and the process virtual machine. The transactions are related to the execution of the program instructions of the virtual platform application. The virtual platform system is configured to compare the captured transactions with pre-stored transactions, preferably stored in a blockchain, to (Continued)

obtain a comparison result, and to allow the execution of the program instructions depending on the comparison result.

13 Claims, 11 Drawing Sheets

(51) Int. Cl.
  *G06F 21/52* (2013.01)
  *G06F 21/53* (2013.01)
  *G06F 21/55* (2013.01)
  *G06F 21/56* (2013.01)

(52) U.S. Cl.
  CPC .............. *G06F 21/50* (2013.01); *G06F 21/52* (2013.01); *G06F 21/53* (2013.01); *G06F 21/55* (2013.01); *G06F 21/554* (2013.01); *G06F 21/56* (2013.01); *G06F 21/566* (2013.01); *G06F 2009/45579* (2013.01); *G06F 2009/45583* (2013.01); *G06F 2009/45587* (2013.01); *G06F 2009/45591* (2013.01)

(58) Field of Classification Search
  CPC . G06F 2009/45583; G06F 2009/45587; G06F 2009/45591; G06F 21/50; G06F 21/52; G06F 21/53; G06F 21/55; G06F 21/554; G06F 21/56; G06F 21/566; H04L 9/3236; H04L 9/50
  See application file for complete search history.

(56) References Cited

U.S. PATENT DOCUMENTS

| | | | |
|---|---|---|---|
| 2007/0283195 A1* | 12/2007 | Reinhardt | G06F 11/1484 714/710 |
| 2014/0282539 A1* | 9/2014 | Sonnek | G06F 9/45558 718/1 |
| 2015/0142669 A1 | 5/2015 | Landrok | |
| 2016/0162313 A1* | 6/2016 | Lemanski | H04L 63/123 718/1 |
| 2016/0283352 A1* | 9/2016 | Kraus | G06F 3/0482 |
| 2017/0132520 A1* | 5/2017 | Burroughs | G06N 7/01 |
| 2019/0379543 A1* | 12/2019 | Sethi | H04L 9/3236 |

* cited by examiner

Intangible Assets (I.A.) table

SECURE DEPLOYMENT AND OPERATION OF A VIRTUAL PLATFORM SYSTEM

TECHNICAL FIELD

The present disclosure relates to a virtual platform system for use in a cloud-based system, and a method for use in a virtual platform system.

BACKGROUND ART

Usually, personal computers include combinations of operating systems, applications, and user specific configurations, each of which is managed individually by a user on an ongoing basis. However, many companies are now using desktop virtualization to provide a more flexible option to address the varying needs of their users. In desktop virtualization, a user's computing environment as for example an operating system, with applications, and/or user specific configuration may be separated from the physical computer device of the user such as a smartphone, a tablet, a laptop or desktop computer. Using a technology based on a client-server, a virtualized desktop may be stored in and managed by a remote server, rather than in a local storage unit of the client computing device.

The virtualization systems refer to the process of running a user desktop inside a virtual machine that resides on a server. The server-based desktop virtualization systems may provide personalized desktops for each user, while allowing for centralized management and security. Servers in such systems may include storage for virtual desktop images and system configuration information, as well as software components to provide the virtual machines and allow users to interconnect to them. For example, a server may include one or more virtual machine managers to create and maintain multiple virtual machines, a connection agent, and software to provision and manage the virtual desktops. Desktop virtualization systems may be implemented using a single virtualization server or a combination of servers interconnected as a server grid. For example, a cloud computing environment, or cloud system, may include a set of virtualization servers, storage devices, networking hardware, and other physical resources that may be used to provision and execute virtual machines, along with additional computing devices to provide management and users interfaces for the cloud system.

Cloud systems may create and manage virtual machines for clients over a network, providing remote clients with computational resources, data storage services, networking capabilities, and computer platform and application support. For example, a client in a cloud system may request the creation of one or more virtual machines having specified capabilities as for example processor capacity, disk storage capacity, bandwidth. Within the cloud system, a resource manager may select virtualization servers also called host machines to accommodate the new virtual machines and may provision and create the new virtual machines using the resources of the host machines and other physical resources within the cloud computing environment such as storage disks, network devices and communication interfaces.

Hardware clients may be virtualized as pure software (SW) instances into the cloud, but there is no good solution for deploying secure elements such as smartcards as pure software (SW) instances into the cloud in a secure and operable manner, and keeping these SW instances secure while being able to operate, patch, and/or revoke the SW instances. Therefore, there is a need for securing deployment and operations of virtual platforms being deployed in a public cloud.

SUMMARY

The present disclosure provides a solution for securing deployment and operations of virtual platforms being deployed in a public cloud, which is particularly needed for virtualization of secure hardware elements.

According to an aspect of the invention, a virtual platform system is proposed for use in a cloud-based system. The virtual platform system can comprise a virtual platform simulator configured to represent in software at least a part of a physical remote client device. The virtual platform simulator can further be configured to have the at least part of the physical remote client that is represented in software interact with a virtual platform application. The virtual platform system can further comprise a process virtual machine configured to execute program instructions of the virtual platform application. The process virtual machine can comprise a code morpher component configured to transform the program instructions of the virtual platform application into native program instructions for execution on a physical host machine of the cloud-based system. The virtual platform system can further comprise one or more interception components configured to capture transactions from at least one of the virtual platform simulator and the process virtual machine. The transactions can be related to the execution of the program instructions of the virtual platform application. The virtual platform system can be configured to compare the captured transactions with pre-stored transactions to obtain a comparison result, and to allow the execution of the program instructions depending on the comparison result.

Advantageously, transactions related to command that are to be executed by the virtual platform system may thus be verified against pre-stored transactions to ensure that the command is conform an expected command before execution. Furthermore, a command/response pair may thus be verified before execution by the virtualized hardware. The command may originate from an external client that makes use of virtualized hardware in the virtual platform system, e.g. operating in a public cloud.

In an embodiment the captured transactions can comprise first transactions captured from the virtual platform simulator by a first interception component. The first transactions can include at least one of: a semihost transaction that is used on the physical host machine, such as file I/O or pipes related commands or responses; a semihost transaction that leaves the physical host machine for transmission to the physical remote client, such as USB, Ethernet or UART related commands or responses; a transaction from behavioral, functional or semi-hosting parts.

In an embodiment the captured transactions can comprise second transactions captured from the process virtual machine by a second interception component. The second transactions can include virtual machine internal transactions, states and/or logs, the second transactions being related to at least one of: a simulator core engine; the morpher component; a compiler; runtimes; and interfaces.

In an embodiment the virtual platform system can comprise a debugger interface comprising a third interception component. The captured transactions can comprise third transactions captured from the process virtual machine by the third interception component. The third transactions can include virtual machine external transactions, states and/or logs, the third transactions being related to at least one of: a used CPU; a used peripheral; a used computer bus; a used computer memory; a used operating system; an output from a verification, analysis and profiling module; and debugger traces.

In an embodiment the captured transactions can be linked to a timing reference, such as a tick from a quantum tick component of the process virtual machine. Multiple related captured transactions can be grouped by the timing reference to obtain a group of captured transactions. The group of captured transactions can be compared with a pre-stored first group of transactions to obtain the comparison result.

In an embodiment the timing reference can be set according to a sampling rate. A higher sampling rate can result in a higher number of transactions in the group of transactions and in the pre-stored group of transactions. A lower sampling rate can result in a lower number of transactions in the group of transactions and in the pre-stored group of transactions.

In an embodiment the group of captured transactions can be related to one command/response pair at the virtual platform simulator of a communication with the physical remote client device.

In an embodiment the virtual platform system can be configured to calculate a hash value of the captured transactions. The virtual platform system can be configured to compare the hash values of the captured transactions with pre-stored hash values of the transactions to obtain the comparison result.

In an embodiment the pre-stored hash values are stored in a smart contract on a blockchain.

In an embodiment the virtual platform system can further be configured to obtain the pre-stored transactions during a training phase wherein a predetermined set of command/response pairs is provided to the one or more interception components for recording transactions related to the command/response pairs, wherein the pre-stored transactions are based on the recorded transactions.

According to an aspect of the invention, a method for use in a virtual platform system is proposed. The virtual platform system can have one or more of the above described featured. The method can comprising capturing transactions from at least one of a virtual platform simulator and a process virtual machine of the virtual platform system. The transactions can be related to execution of the program instructions of a virtual platform application. The method can further comprise comparing the captured transactions with pre-stored transactions to obtain a comparison result. The method can further comprise allowing the execution of the program instructions depending on the comparison result.

In an embodiment the method can further comprise calculating a hash value of the captured transactions, and comparing the hash values of the captured transactions with pre-stored hash values of the transactions to obtain the comparison result.

In an embodiment the pre-stored hash values can be stored in a smart contract on a blockchain, and the virtual platform system can request permission from the smart contract for executing the program instructions.

Hereinafter, embodiments will be described in further detail. It should be appreciated, however, that these embodiments may not be construed as limiting the scope of protection for the present disclosure.

BRIEF DESCRIPTION OF DRAWINGS

Embodiments of the disclosure will now be described, by way of example only, with reference to the accompanying schematic drawings in which corresponding reference symbols indicate corresponding parts, and in which.

Figure 1:
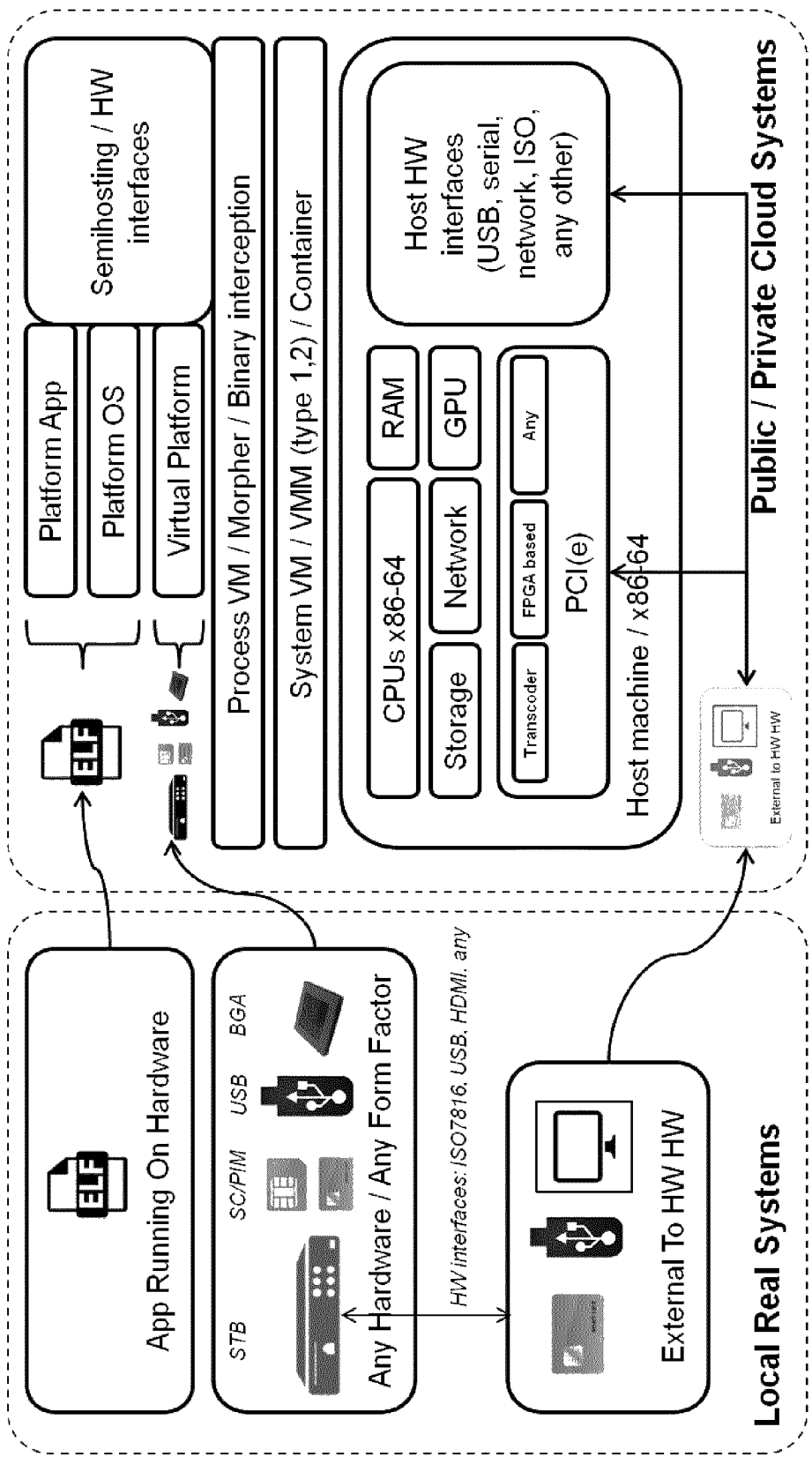
FIG. 1 shows an exemplary block diagram of a cloud-based system, wherein local real systems components are virtualized in the cloud-based system.

The figures are meant for illustrative purposes only, and do not serve as restriction of the scope or the protection as laid down by the claims.

DESCRIPTION OF EMBODIMENTS

The disclosed cloud-based system may be configured to provide computer based services to at least one remote client device via a network communication link. The cloud-based system may comprise at least one host machine and a set of virtual platforms. The at least one host machine may be configured to execute at least one system virtual machine to execute at least one process virtual machine. In other words, the process virtual machine may execute inside the system virtual machine and the system virtual machine may execute inside the host machine.

The network communication link may be of any type such as wired, wireless, or a combination of wired and wireless network using any suitable communication technology allowing high throughput bidirectional data transmission.

The set of virtual platforms may be configured to represent hardware resources of the at least one remote client device, to execute at least one virtual platform application that represents a remote client device application, and/or at least one platform operating system that represents the remote client device operating system. The set of virtual platforms may be associated with semi-hosting or co-simulation interfaces and hardware interfaces configured to bidirectionally communicate with the at least one host machine and outer real world.

A process virtual machine may be configured to execute program instructions of one or more virtual platform applications running on a virtual platform operating system, said virtual platform operating system running on at least one virtual platform. The process virtual machine may include an instruction or code morpher and binary interception functions that may be used for instance for analytics purpose such as discovery, interpretation, communication and statistics of meaningful patterns of any kind.

An instruction or code morpher is a program, or software component, that automatically transforms application code from source Instruction Set Architecture (ISA) into a destination source ISA. The destination ISA corresponding to the native host machine processor used ISA (generally of x86-x64 type but can be another one), the source ISA corresponding to the virtual platform used and emulated processor ISA that generally differs from the destination ISA hence the interest of using such a code morpher. Each code morpher typically supports a unique and specific atomic transformation algorithm for each new destination/source ISA transformation pair.

A system virtual machine may be configured to provide hardware resources and computing capabilities provided by the host machine and to provide interfaces to the set of virtual platforms. The host machine provides hardware resources, computing capabilities and interfaces to the at least one system virtual machine and to the at least one process virtual machine and also interfaces to the remote client device or local real system.

The term "cloud" as used herein may refer to a network of remote servers hosted on the Internet and used to store, manage, access to software and other resources, and process data in place of local servers or personal computers. The "cloud" can be of private or public nature in that sense where and by whom the "cloud" is hosted and is not a restriction here. The "cloud" may be a combination of a private and a public cloud, for example a private cloud within a public cloud.

The block diagram of FIG. 1 shows that most of hardware and software components of local real systems or client devices may be moved to the cloud-based system. The configuration of the local real systems may therefore be reduced at minimum since most hardware and software functions may be distributed into the cloud. For example, in case of a television set top box, access controlled multimedia content processing functions, security module devices managing access to the multimedia content, multimedia player applications, et cetera may be moved to virtual platforms of the host machine in a standard file format used for executables, object code, shared libraries such as Executable and Linkable Format (ELF) or any other standard or custom file format the virtual platform emulated processor is able to load, understand and execute.

The remote client device or the local real system, in this example a set top box, may comprise mainly network communication interfaces and interfaces for local connection with a multimedia content rendering device as for example a television set.

The present disclosure is not limited to the principles as described for the set top box and may for example be used with any other client device, such as a smartphone and its SIM (Subscriber Identification Module) where the SIM itself may be completely or partially moved to a virtual platform as well. The smartphone may then remain connected via the network (e.g. GSM, LTE etc.) to the operator's infrastructures while the SIM resides as a virtual platform on a host that is part of a cloud infrastructure. The virtualized SIM may be seen and used by the smartphone via the network (e.g. GSM, LTE etc.).

The boundaries delimiting local real hardware and software systems and hardware and software representation in the cloud may be flexible at may be easily changed or adapted.

The host machine—also designated as host server—may comprise real hardware comprising Central Processing Units or processors (CPU), Graphic Processing Units or graphic processors (GPU), Random Access Memories (RAM), Non-Volatile Random Access Memories (NVRAM), mass storage memories and/or communication interfaces. The communication interfaces allow the host machine communicating with cloud services of any type via the communication network or any other local or remote link.

The disclosed cloud-based system may combine system virtual machines and process virtual machines providing flexible migration and update paths into the cloud for any hardware software system incorporating for example a complete CAS (Conditional Access System) and enabling for very high-speed execution that can scale nearly linearly at will. Any hardware and software component being part of a CAS system may be moved into the cloud as pure software or simulated hardware platform or component, as for example: Hardware Security Modules (HSM) or smartcards (SC), Trusted Platform Modules (TPM), Personal Information Managers (PIMs), Subscriber Identification Modules (SIM), Head End (HE) and operator systems, set top boxes and associated devices. Of course, other components coming as a piece of any hardware on which runs any Operating System (OS) and/or application or firmware code may be added to virtual platforms of the cloud-based system.

Figure 2:
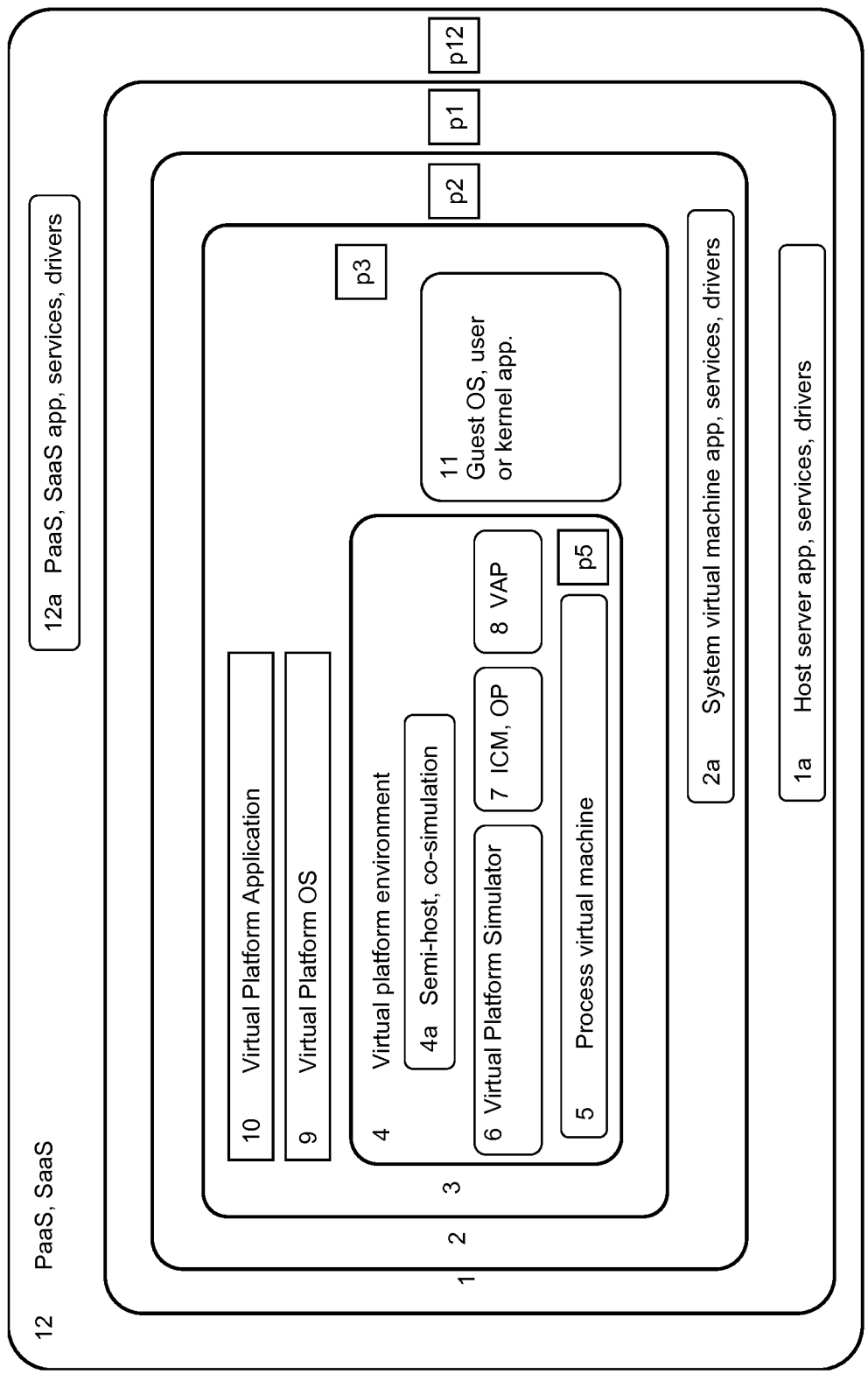
FIG. 2 shows an exemplary block diagram of a cloud-based system and its hierarchical architecture of hardware and software components.

With reference to FIG. 2, the host machine or host server 1 may comprise software items 2 to 11 embedded into each other and arranged according to a hierarchical architecture. The software items may comprise at a highest level the at least one system virtual machine 2 on which may run a standard operating system or a container based system 3 of any type. The standard operating system or container 3 may manage at least one process virtual machine 5, which may comprise tools 8 for software running verification, analysis and profiling, extension and interaction APIs (Application Programming Interfaces) 7, a virtual platform simulator 6 representing any real hardware, a semi-host or co-simulation API 4a to communicate with the outer virtual and real world, and/or binary interception technology to completely monitor and control in a non-invasive way complete virtual platform simulator 6 execution for instance for analytics purpose, binary interception technology typically being part of item 5 itself. The process virtual machine 5 may be configured to drive and execute the at least one virtual platform simulator 6 part of a virtual platform environment 4. The guest OS 3 that may be a standard operating system or container may further comprise at least one user and/or kernel application, driver, library or service 11. The guest OS 3 may be configured to interact with item 4a.

Depending on type of virtual machines or containers or any combination of formers regarding items 2 and 3, the boundary may vary between items 1, 2 and 3 both for hardware and software boundaries.

The real hardware of the host server 1 may be configured to run the software items 2 to 11 including the sub-items 1a, 2a and 4a. The sub-item 1a running on the host server 1 may comprise applications, services, drivers and software for allocation, monitoring, reporting, control, securing purposes or any other wanted interaction between the host server 1 and the upper items 2 to 12 typically forming layers embedded in each other.

The host server real hardware may be preferably based on high performance processors as for example of type Intel x86-x64 but may be of any other type. RAMs (Random Access Memories) storage and network resources with authentication/identity services and resources may complete the real hardware. The computing capacity or power of the processors and the memories storage capacity are typically extendable.

The system virtual machine 2 on which may run the setup including items 3 to 11 may comprise a sub-item 2a. The sub-item 2a in a similar way as the sub-item 1a typically running on the host server 1 may comprise applications, services, drivers and/or software for allocation, monitoring, reporting, control, securing purposes or any other wanted interaction between the system virtual machine 2 and the upper items 3 to 12 typically forming layers embedded in each other and the lower layer typically formed by the host server 1.

The system virtual machine 2 may be of Type-1—also called native or bare-metal—hypervisor such as for example VMWare ESX, OpenStack, Microsoft Hyper-V, KVM (Kernel based Virtual Machine), QEMU (Quick Emulator) which may be a free and open-source hosted hypervisor that performs hardware virtualization, or any other type.

The system virtual machine 2 may be of Type 2—also called hosted—hypervisor such as VMWare Player needing an underlying fully-fledged operating system—e.g. Windows, Linux, Apple IOS or Unix—or any other type of hypervisor or container-based or operating system-level virtualization based systems such as e.g. OpenVZ, which is a light weight operating system-level virtualization technology for Linux. It allows a server to run multiple isolated operating system instances or containers.

A hypervisor may be defined as a Virtual Machine Monitor (VMM) that is a piece of software, firmware or hardware that creates and runs virtual machines. The hypervisor presents guest operating systems with a virtual operating platform and manages the execution of the guest operating systems. Multiple instances of a variety of operating systems may share the virtualized hardware resources as for example, Windows, Linux, Apple IOS or Unix instances can all run on a single physical Intel x86-x64 processor or any other type of processor.

The guest OS 3 on which may run the complete setup including items 4 to 11 may be of any type, for example of type Windows, Linux, Apple IOS or Unix.

The virtual platform environment 4 may include for example an Advanced Multicore Software development Kit from Imperas called Imperas Multicore Software Development Kit (M*SDK™). The M*SDK™ is a complete embedded software development and simulation environment that operates using virtual platforms and is specifically designed to handle complex multicore related aspects. M*SDK™ contains all the capabilities of a Multicore Developer (M*DEV) product including all platform, pre-build or to be build peripheral and pre-build or to be build CPU model development technologies and high-performance simulation system and associated code morpher engines, using this as a basis for the software development kit components. M*SDK™ further comprises a comprehensive Verification, Analysis, and Profiling (VAP) tool set 8, plus an advanced 3-dimensional (temporal, spatial and abstraction) debug solution, named 3Debug™, for heterogeneous multicore processor, peripheral, and embedded software debug. Both the Verification, Analysis and Profiling (VAP) tools, as well as the 3Debug™ environment contain a range of highly advanced capabilities to handle unusual problems while also enhancing embedded code for multicore designs and complex processor platforms. Custom capability may be easily created to handle specific scenarios. The system uses advanced technologies to improve the performance and reliability of the solution, eliminating wasted hours of unnecessary engineering effort. Other technologies such as ToolMorphing™ and SlipStreamer™ are part of M*SDK™ allowing for complete instrumentation, analytics and introspection purpose without touching or instrumenting at all original virtual platform associated simulation models—CPU and peripheral models, platform model—on top running virtual platform OS or kind of such and its on top running virtual platform application itself.

Item 4 may also include an Imperas EPK (Extended Platform Kit) that is a complete platform executable arrangement composed by one or several same or different processors and one or several same or different peripheral models including all linking elements such as busses, memories, registers, FIFOs (First In, First Out) registers. Item 4 may enable semi-host or co-simulation interfaces 4a enabling means to the at least one virtual platform to communicate outside its very proper process virtual machine process, e.g. Imperas simulation runtime 5 with the outer world that is here the standard operating system or container that is to say the guest OS 3, and application or item being part and inside item 3, e.g. item 11 with user and/or kernel applications.

Item 4a may allow executing and control code on the guest OS side as native guest OS application code 3, 11 out of the virtual platform environment 4 running within the specific process virtual machine context/runtime 5 by keeping control and synchronization up and alive between the virtual platform environment 4 and guest OS 3 and all other applications running inside the guest OS context (e.g. item 11).

Item 4a may allow to run parts of the virtual platform environment 4 as native guest OS application code 3, 11 that could be for reasons such as code execution performance improvement or need to interact with real world and underlying real hardware devices of any type (items 3, 2, 1).

The process virtual machine 5 may comprise the simulation core runtime or morpher engine and license runtime allowing for platform simulation model 6 associated tools (items 7 and 8) and semi-host/co-simulation 4a execution. The process virtual machine may further provide on top various interface APIs (Application Programming Interface) for platform introspection, extension and interaction (ICM API and OP API, item 7) and verification, analysis and performance monitoring (VAP API, item 8). The process virtual machine 5 may further interact with the semi-host/co-simulation interfaces 4a. The process virtual machine 5 may also provide means to externalize/replace original Imperas simulation core runtime (part of item 5) by another one such as a SystemC based simulation core runtime. In that case item 4 and all its comprised items including the process virtual machine 5 may become slaves and are actively driven by the new extern/replacing for instance SystemC simulation core runtime. In that case SystemC and associated TLM2.0 may be used as yet another way to create interfaces with the real outer world or other real hardware devices of any kind via so called transactors in a similar way item 4a provides means of semi-hosting and co-simulation.

The process virtual machine 5 may be unlocked with additional license features such as Imperas QuantumLeap™. The peripheral simulation model may further be for instance multi-threaded and better decoupled from the rest of the virtual platform simulator 6 to increase performance scalability for a N-instantiated virtual platform simulator 6 or virtual platform environment 4 running on a multi-CPU guest OS 3 itself running a multi-CPU system virtual machine 2 itself running on a multi-CPU host machine or server 1. The process virtual machine 5 and the virtual platform simulator 6 aim to scale in terms of performance nearly linearly for virtual platform simulation model 6 that may be a complex AMP/SMP (Asymmetric/Symmetric Multiple Processor a.k.a. heterogeneous/homogeneous systems respectively) system or SoC (System on Chip) with many peripherals simulation models running on a multi-processor host servers hardware, item 5 providing multi-processor mapping capabilities (MP on MP) also named QuantumLeap™ between the virtual platform simulator constituting CPU simulation models of any type and configuration (AMP, SMP) and the underlying visible by the guest OS 3 real host server physical CPUs 1. The guest OS 3 CPUs may themselves be considered as virtual CPUs by the mean of the system virtual machine 2 that provides CPU resources as virtual CPUs out of host server CPU resources constituted by real physical CPUs.

The virtual platform simulator 6 representing all or part of the real remote client device may be the complete platform executable and hardware description including all processors, peripherals, memories, busses and semi-hosting interfaces and integrations. The virtual platform simulator 6 may run through of the process virtual machine 5. Items 5 and 6 may directly interact to or may be strongly interlinked with items 4a, 5, 7 and 8. The semi-hosting interfaces 4a used by the virtual platform simulator 6 may comprise any number and type of interfaces as for example USB (Universal Serial Bus), TCP/IP (Transmission Control Protocol)/(Internet Protocol), ISO 7816 smartcard, RS232, PCI(e) local serial bus of Peripheral Component Interconnect express standard, graphic display frame buffers.

Item 4a may be configured to connect and use any hardware resource being presented by the guest OS 3 through any combination of user and kernel drivers allowing for that purpose. Therefore, item 4a may also allow to gain access to any underlying real hardware of the host machine 1 that may be made visible by the system virtual machine 2 to the guest OS 3 hence giving the virtual platform environment 4 means to communicate to the real outer physical world.

The item 8 VAP including API for verification, analysis and performance monitoring may be used by the process virtual machine 5. The VAP may be enabled and disabled at will either at start up and/or at runtime and is not mandatory to be enabled for allowing execution of a virtual platform simulation model 6.

The virtual platform operating system OS 9 may run and execute on the virtual platform simulator 6 and may be of any type as for example super loop (program structure including an infinite loop of checking tasks for example), real-time OS, pre-emptive, templated, embedded, et cetera.

The virtual platform application 10 may run on the virtual platform OS 9 that runs on the virtual platform simulator 6.

The user and/or kernel applications, services, drivers 11 of the guest OS 3 may include any potential software that may run on the guest OS 3 for allocation, monitoring, reporting, control, securing purposes and/or any other desired interaction with the items 4 to 10, the upper item 12 and the lower items 1 to 3 layers.

The top layer may include the cloud 12 comprising components such as for example Software as a Service (SaaS), Network as a Service (NaaS), Platform as a Service (PaaS), Infrastructure as a Service (IaaS) or a combination thereof, and any related cloud components (hardware, software, service) may also be part of the cloud 12 or any other type of service XaaS, X can be any cloud component. Item 12 may be partially or fully executed within or be part of item 1. Item 12 may be located outside item 1 or partially or fully be part of item 1 itself in case for example item 1 also be host for higher level XaaS cloud type services.

The sub-item 12a may include any potential applications, services, drivers and software that may run in the cloud 12 itself for allocation, monitoring, reporting, control, securing purposes and/or any other desired interaction between the cloud 12 and the lower items 1 to 11 layers.

The cloud 12 may be privately held and operated by a company. The cloud 12 may be rent from a larger cloud solution provider being held by a large provider such as Microsoft or Amazon.

Each item layer represented by the host server 1, the system virtual machine 2, the guest operating system 3, the process virtual machine 5, and the top cloud layer 12 may be associated with a protection item respectively p1, p2, p3, p5 and p12. These protection items provide means for controlling and determining which resource may be used by whom, when, where and how, that is to say under which conditions and circumstances. Protection items may be of pure software, pure hardware or a mix of software and hardware nature.

Other means of protecting critical resources such as the system virtual machine itself (hypervisor, Virtual Machine Manager (VMM) of Item 2) and process virtual machine 5 may directly embed and bring their own control and protection mechanisms.

The protection item p1 may isolate, protect, control, monitor and/or determine host server hardware, software, service and driver resources (item 1, item 1a) being used, shared and allocated.

The protection item p2 may isolate, protect, control, monitor and/or determine system virtual machine and its hypervisor/Virtual Machine Manager hardware, software, service and driver resources (item 2, item 2a) being used, shared and allocated.

The protection item p3 may isolate, protect, control, monitor and/or determine the guest operating system (item 3) hardware and software resources and all included items (items 4, 4a, 5, 6, 7, 8, 9, 10, 11) being used, shared and allocated.

The protection item p5 may isolate, protect, control, monitor and/or determine process virtual (item 5) hardware, software and all item 4 included sub-items resources being used, shared and allocated.

The protection item p12 may isolate, protect, control, monitor and/or determine cloud (item 12) hardware, software and service resources being used, shared and allocated.

All protection items p1, p2, p3, p5, p12 may operate independently (single entry point), but authenticated, ciphered, trusted, nested and/or secured intercommunications between all or part of items p1, p2, p3, p5, p12 may be envisaged to create strong binding policies and custom rule sets and policies between the different layers being protected for example to administer underlying infrastructure between all the item layers (items 1 to 12 including items 1a, 2a and 4a). All protection items may overlap into each other to advantageously provide and enforce protection continuity when moving from one layer to another one.

The protection items may comprise protection mechanisms that may use techniques of sandboxing, Just in Time (JIT) on-the-fly source code compilation, Ahead of Time (AOT) anticipated source code compilation, morphing, encryption or authentication, white box cryptography (WBC), homomorphic cryptography or any cryptography implementation configured to protect from keys/secrets extraction, and to allow computations to be carried out on cipher text only or any other type of protection or obfuscation mechanisms existing today or arising in the future.

The protection items may comprise HSM (Hardware Security Module) or TPM (Trusted Platform Module) based solutions or any other solution using special and custom hardware and hardware security crypto-processor chips and associated software running on it.

The protection items may include any type of governance and security administration items or infrastructures such as Apache Ranger.

The protection items may comprise protection mechanisms that may use future techniques of cryptography or any kind of protection such as Machine to Machine (M2M), Artificial Intelligence to Artificial Intelligence (AI2AI) assisted cryptography or quantum cryptography used for example for quantum key distribution and random generators or device-independent quantum cryptographic protocols and blind quantum computation.

When using a cloud-based system such as described with FIGS. 1 and 2 for deploying security sensitive hardware—for example smartcards or SIM cards—as pure software instances into the cloud, there is a need for keeping these software instances of the hardware secure while being able to e.g. operate, patch and/or revoke the software instance of the hardware. In the following, a solution is presented for further securing deployment and operations of virtual platforms being deployed in a public cloud, allowing security sensitive hardware to be securely virtualized in the cloud-based system.

A known example of securing exchange of e.g. goods or values between two peers in an inherently exposed and unsecured environment makes use of a blockchain. A blockchain provides a secure by design system where pairs or an ensemble of instances or people can exchange goods without the intervention of a third party such as a bank or a (root) trustee. Typical characteristics of blockchains include being distributed, secure by design, managed autonomously, secured from tampering and revision, and decentralized. A blockchain may have plugin functionalities enabling loading custom consensus algorithms. An example of a known open source implementations of a blockchain is IBM's Hyperledger framework (HLF). A blockchain may be of a permisionless type or permission type. The differentiation between permission types makes layered and hierarchized blockchains possible, which may be important to enable intervention to update configurations or rules applying to the blockchains—e.g. soft and hard forks, consensus algorithm, hardware (HW) enforcements, et cetera.

The cloud-based system such as described with FIGS. 1 and 2 may be further secured using transactional technology such as a blockchain. A process virtual machine and blockchains may be combined to create a secure software system in the cloud representing both hardware and software as a pure software virtualization.

Blockchain is typically about protecting and in a timely fashion chain of blocks of transactions. All transactions are recorded into a publicly shared ledger everybody can see, use and compute on it. All transactions are cryptographically secured, immutable, secured from tampering and revision. Main cryptographic functions used in a blockchain are hashing—generally SHA-256 being as much resistant as possible to collisions—and PPK (Public/private keys like RSA) for encryption/decryption but also signing purposes.

Figure 3:
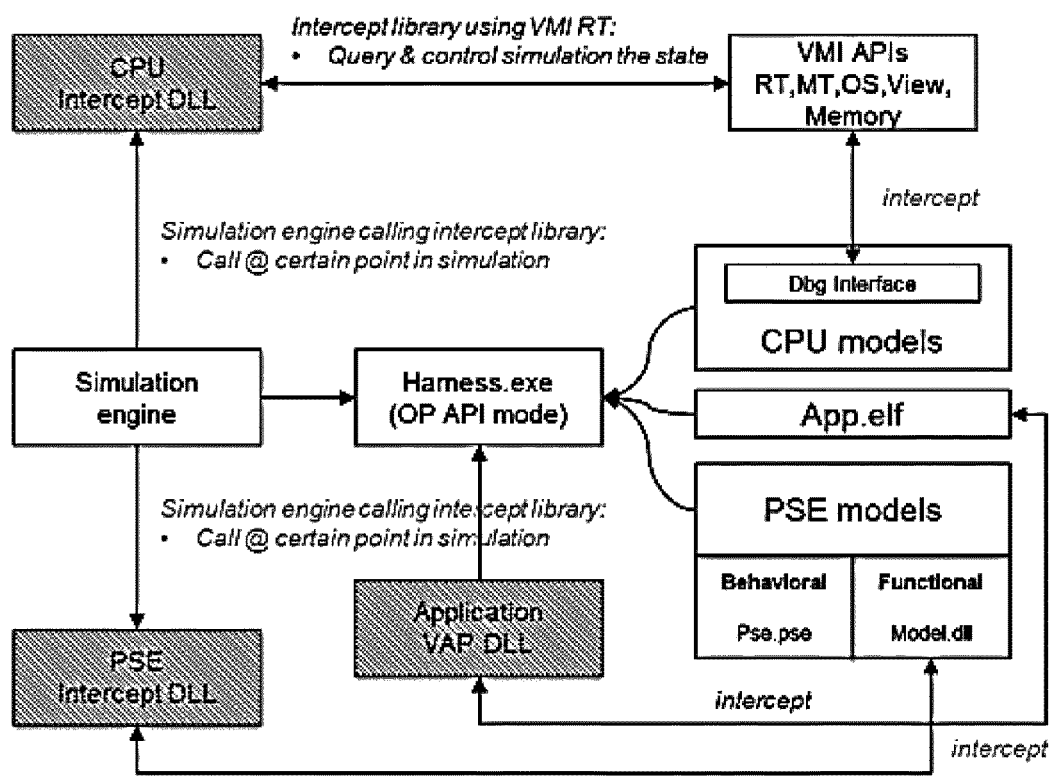
FIG. 3 shows an exemplary block diagram of a virtual platform including binary interception concepts.

Blockchains and virtual platform models executing real application software in the cloud may be combined as will be explained below. FIG. 3 depicts an exemplary complete virtual platform system setup including the application running on it. The virtual platform system model of FIG. 3 may correspond to the cloud-based system of FIG. 1 or 2. To keep concepts simple, only most important and key functional blocks are shown in FIG. 3, with special attention to the interfaces between the blocks since that is where (a part) of the transactions occur. Other transactions may occur inside the functional blocks themselves.

The simulation engine typically runs at simulation construction and destructions, before each instruction is morphed. The simulation engine may run when a specific instruction type is executed, when a specific address is executed, when specific memory address ranges are read or written, when a specific programmers view event occurs, when a user invokes a command defined by the library, and/or after a specific number of instructions have been executed.

The arrow between the VMI APIs and the CPU intercept DLL depicts an examination of the state of the processor including general purpose and system registers. Here, programmers view objects may be examined, the simulation environment may be examined, the simulated behavior for an instruction may be replaced, symbolic and debug information may be accessed for the application program being run, a GDB may be used to evaluate expressions for the current running application program, simulator callbacks may be added or deleted to the library, and/or other binary interception libraries may be communicated.

The CPU intercept DLL, PSE intercept DLL and Application VAP DLL are binary interception libraries that allow OS or app software execution on a CPU model or behavioral code execution on a PSE model to be unobtrusively monitored. This provides, for example, the ability to run un-instrumented binary code on a processor module and yet provide complete code coverage analysis.

The virtual platform as shown in FIG. 3 may rely on an Imperas simulation technology. Three groups of functional entities may be identified. The first group may include the Imperas native simulation engines and interfaces APIs: simulation (core) engine itself (Instruction Set Simulator), harness load engine, VMI APIs. This is the basic infrastructure. The second group may include simulation models or Imperas models: CPU and PSE simulation models including semi-hosting APIs into underlying host system and the application binary itself running on the virtual platform. This is the modelled native and personal setup of a virtual platform and typically represents the functional custom hardware as a piece of pure software. The third group may include binary interception libraries of various kind to query and fully control the virtual platform simulation state that also includes monitoring of the application itself: CPU intercept DLL, PSE (Peripheral) intercept DLL and VAP DLL (Verification, Analysis and Profiling). This is typically the native and personal setup of very specific interception libraries designed for the exact needs of how fine grained the execution of the whole virtual platform system setup is to be controlled.

The Imperas binary interception may enable full control and insight into the platform execution at runtime without touching a single bit of the original application code and underlying CPU/PSE models themselves. Interception may be performed from the outside and typically doesn't intervene into the original code itself. The same may apply for the simulation models (CPU, PSE) that simulate the real HW—they are typically not touched since interfaces already are provided by Imperas runtimes and associated APIs such as the VMI APIs (Virtual Machine Interface).

Generally, binary interception may provide opaque or transparent modes to replace functionality of underlying instruction or as an addition of and existing underlying functionality. Binary interception may be run before each instruction executes, for specific instructions, addresses, and/or memory read/write. Regarding the CPU, each instruction may be intercepted or a static list of those being intercepted may be obtained prior morphing (JIT translation) and real execution on the host ISA (Instruction Set Architecture). Regarding the PSE, memory, functions, registers, stack and various I/O may be intercepted. Regarding application, binary interception may include dynamic traces of functions/variables, dynamic call graphs, abstraction layers (CPU, OS, application, other).

Two kinds of transactions may be distinguish: at load/unload time and at runtime.

Load time is typically when all blocks are going to be connected together; loading each block (or dynamic library) may be seen as transactions that need to be trusted and validated. Loading process in general happens through the harness.exe program and/or the simulation engine itself (the core ISS).

Runtime is typically when the whole virtual platform simulation models (CPU, PSE) and application running on those are loaded into the (simulator) memory, running and ready for the execution itself. In FIG. 3 that would be the application (App.elf) block executing on the virtual platform represented by the CPU and PSE models blocks themselves. Different transactions may be controlled in a very fine grained fashion, either CPU or PSE or application centric.

The combination of CPU, PSE and application may be enforced in a certain way by combining them in so called TX roots used for blockchains, as will be further explained below.

Figure 4:
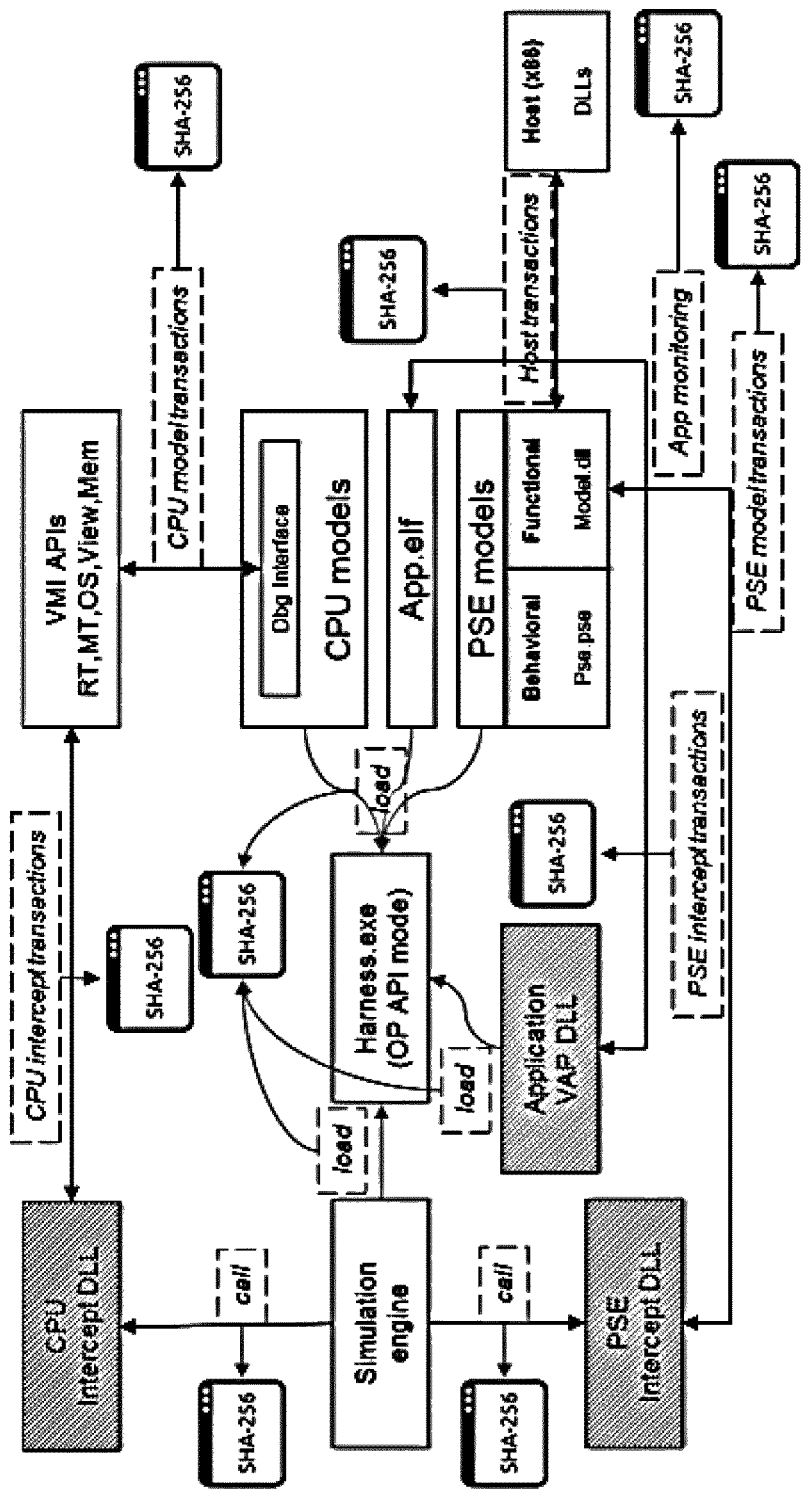
FIG. 4 shows an exemplary block diagram of a virtual platform including binary interception concepts and transactions.

FIG. 4 shows an example of the transaction part on a virtual platform as shown in FIG. 3. The "SHA-256" named boxes are for illustrative purpose despite hashing may be used to uniquely hash a given transaction hence make it unique and inalterable.

Boxed depicted "blue" may be the transactions occurring at load and unload time. The blue boxes relate to modules loaded—CPU and PSE models, the application itself but also the intercept libraries (shaded boxes)—and may be used to ensure that these are trustable and not altered. Two classes may be identified. The first class may involve simulation models and the application itself: CPU models, PSE models, App.elf and harness.exe itself. The second class may involve intercept libraries, possibly in three flavors: CPU, PSE and application (VAP) represented by shaded boxes.

Boxes depicted "red" may be the transactions occurring at runtime while the whole virtual platform and its application (App.elf) are executing. Four classes may be identified here: CPU models intercepts; PSE models intercepts; Application code intercepts; Host code intercepts.

Groups of transactions may be regrouped for use in blockchains.

With blockchains, nodes may group (unconfirmed) transactions into a block, each single transactions being hashed in a pyramidal manner: transactions may be linked to create an inter-woven hash tree also know under the name of "Merkle" tree. The Merkle tree may be built like a binary tree. Goal of such trees is to reduce the computing power and address scalability problem when the number of transactions increases.

Merkle trees are also used for so called Merkle proofs. A Merkle proof consists of a chunk, the root hash of the tree, and the "branch" consisting of all of the hashes going up along the path from the chunk to the root. Someone reading the proof can verify that the hashing, at least for that branch, is consistent going all the way up the tree, and therefore that the given chunk actually is at that position in the tree.

Blockchains may use Merkle proofs in order to store the transactions in every block. For a blockchain transaction there is no need to download every transaction and every block but only block headers, typically each composed of one or more of the following five elements: a hash of the previous header, a timestamp, a mining difficulty value a proof of work nonce, a root hash for the Merkle tree containing the transactions for that block (also referred to as Tx_Root).

When a client wants to determine the status of a transaction, it may simply ask for a Merkle proof showing that a particular transaction is in one of the Merkle trees whose root is in a block header for the main chain. The server may find the object, fetches the Merkle branch—i.e. the list of hashes going up from the object to the tree root—and reply back to the client with the branch. The Merkle tree typically only proves inclusion of transactions in a specific block but typically cannot provide information about their current state. To address this, Ethereum for instance takes the Merkle tree one step further. In an Ethereum blockchain there is typically not one single Merkle tree but three of those for following objects: transactions, receipts and state.

Merkle proof may be used to check inclusion of a transaction in a specific block and have a Merkle state transition proof.

In blockchains, other trees may be used instead of Merkle trees. Merkle trees are the classic binary trees most suited for authenticating information being in list format. Unlike transaction history, however, the state typically needs to be frequently updated—in other words Merkle tree are well suited for transactions for instance once nodes are created and then remain unaltered, but less suited for states that change over time. State trees typically change frequently due to e.g. new accounts being added or accounts being removed or keys in storage are frequently inserted and removed to.

For state transitions there exists the so called "Patrician" trees where desired features are: quick computation just after an insert or delete operation, depth of the tree is bounded (so a hacker cannot artificially slow down the system), root of tree depends on data only and not the order in which updates are made (not time bound).

Ethereum may use Patrician trees for states (e.g. current balance of my account): states typically mainly consist in key-value maps (hash-tables) with keys being addresses and values account declarations (balance, nonce, code and storage for each account, storage being itself a tree). The key under which a value is stored may be encoded into the "path" that is to be taken down the tree.

Figure 5:
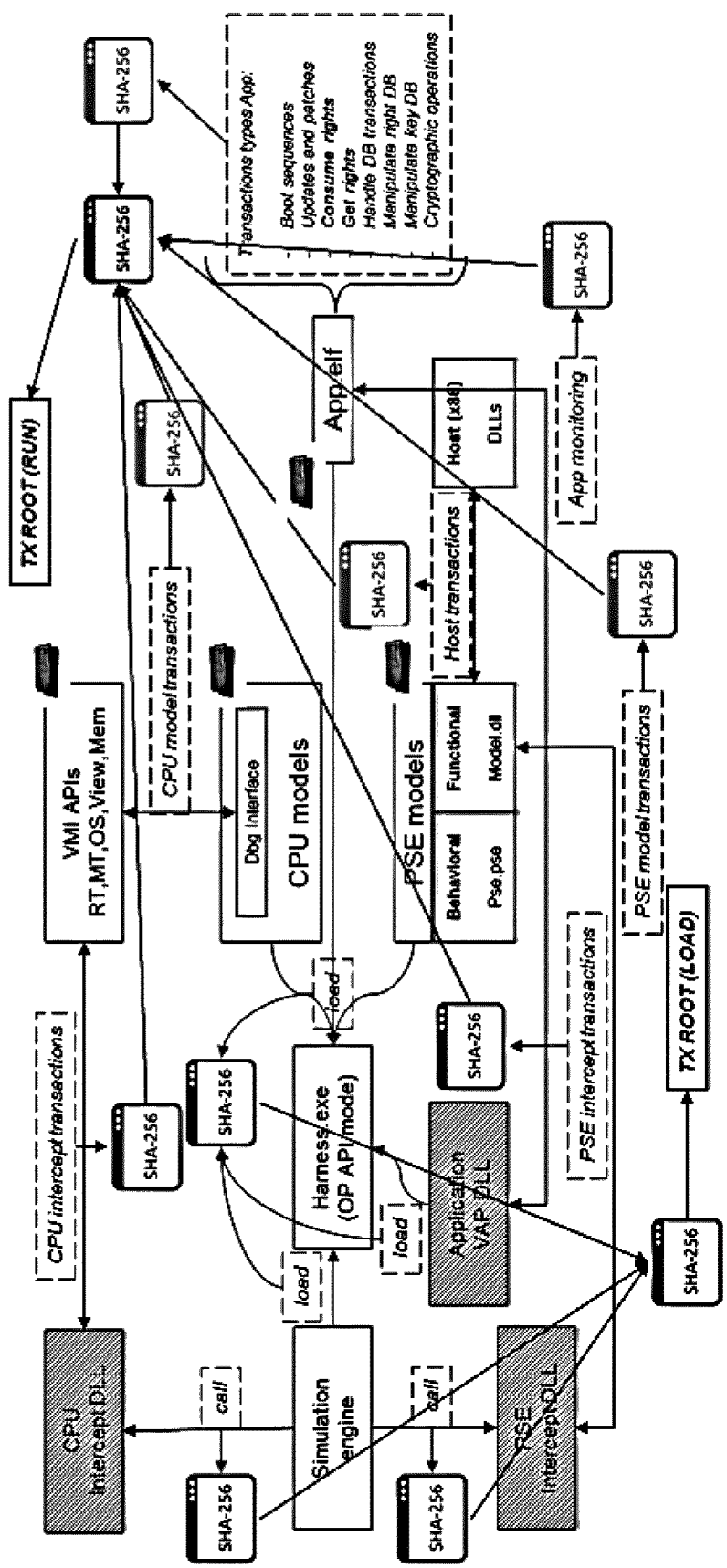
FIG. 5 shows an exemplary block diagram of a virtual platform including binary interception concepts, transactions and mapping on a Merkle tree for blockchain processing.
Figure 7:
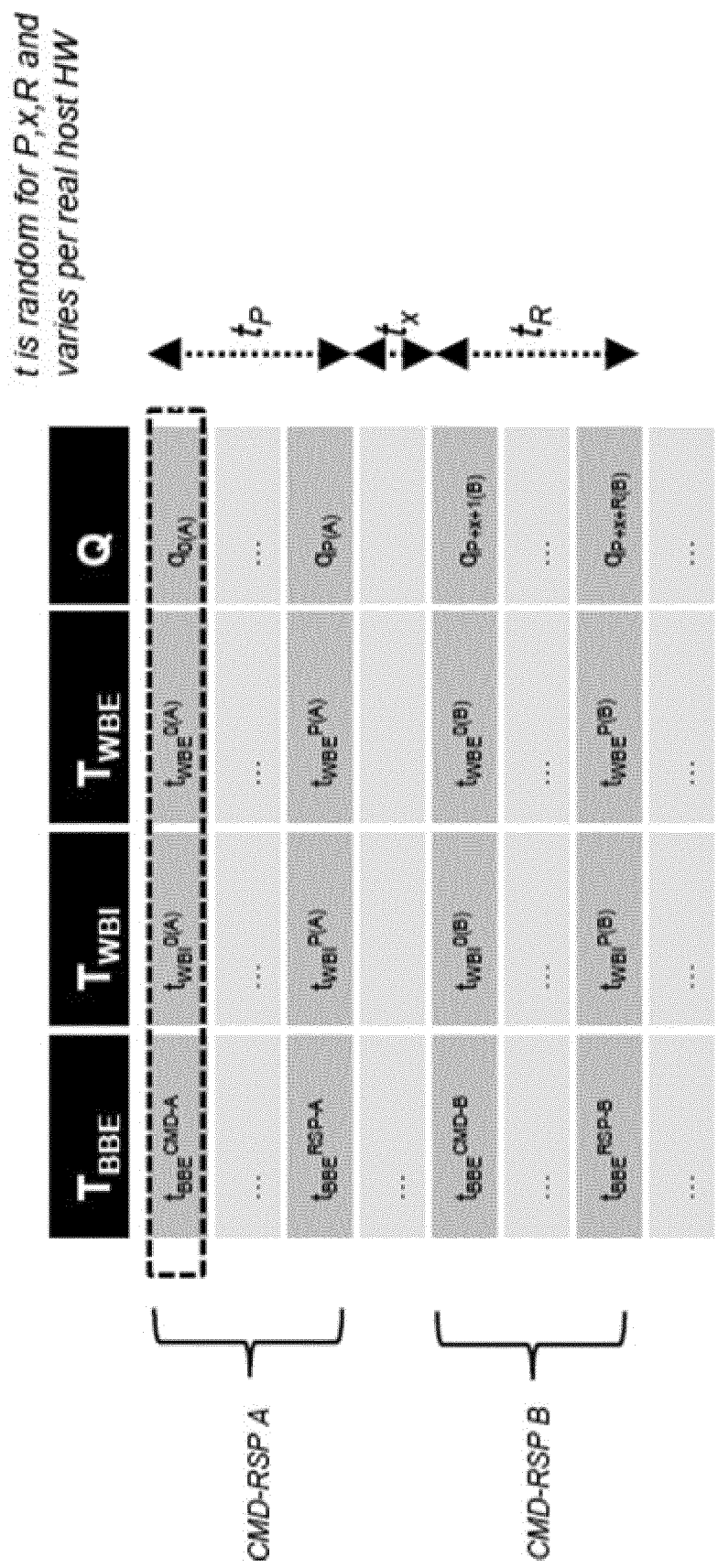
FIG. 7 shows an exemplary table of captured transactions and events.
Figure 8:
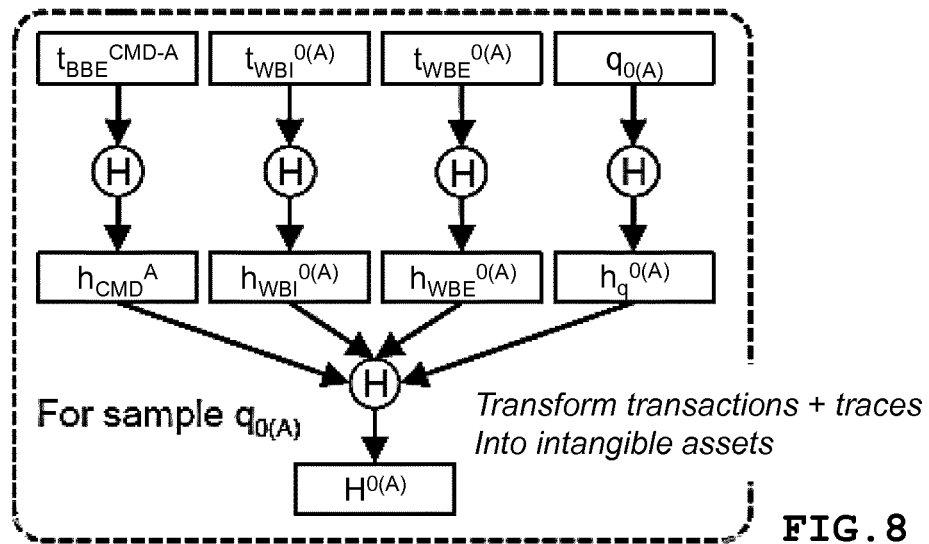
FIG. 8 shows an exemplary hashing of values for creating an intangible assets table.
Figure 9:
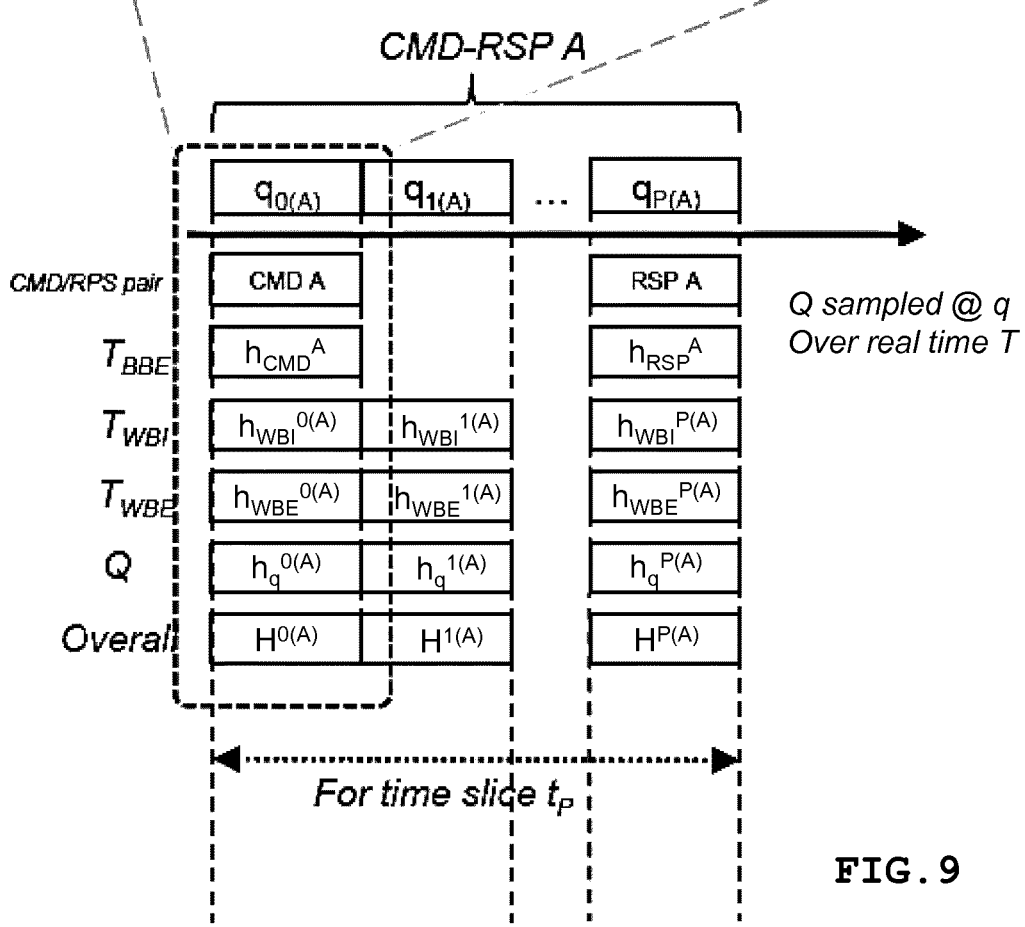
FIG. 9 shows an exemplary intangible assets table for use by a smart contract of a blockchain in combination with a virtual platform system.

FIG. 5 shows an example of how the transactions of FIG. 4 may be processed by a blockchain. In the example of FIG. 5 only two kinds of trees are created: runtime (TX ROOT (RUN)) and load/unload time (TX ROOT (LOAD)). The boxes named "SHA-256" indicate hashed information. A "SHA-256" box may be a transaction and/or a state that can be coded into a blockchain hence be enforced. The hashed information may be used to create an intangible assets table I.A. as shown in FIGS. 7-9 for use by a smart contract on a blockchain to secure deployment and/or operations of the virtual platform.

In FIG. 4 the transactions depicted "blue" may be of the static type meaning they occur rarely e.g. at load and unload phases, hence they can be treated as transactions and may therefore be processed into classic Merkle trees. The transactions depicted "red" may involve state changes. Herein, state changes may be seen at a global system level, between blocks as tuples and also inside blocks themselves as FSM (Finite State Machines) which typically include the logic functions of all the models, libraries, applications making the whole virtual platform. The transactions depicted "red" may be processed into Patrician trees or more generally Radix trees.

Various transactions may be enforced. For instance, "SHA-256" boxes may be linked by computing hashes of the hashes outputs, This may result in two or more TX ROOTs, for example one for call/load and one for run purpose. Any other combination can be made.

In an example the App.elf box may be consuming rights—which may be represented as values—hence resulting at a given moment in a memory read and/or write transaction, memory being the one part of the simulator platform itself that either could be part of the CPU model, the PSE model or even a pure host (RAM based) model for speed purpose for instance. So the "App.elf" box consuming a right may directly link to a memory transaction being carried out be either of the boxes "CPU models", "PSE models", "Host (x86)" or any combination of those. The boxes, transactions and/or states may be blockchain linked together to enforce them further. Imperas binary interception APIs may be used to gain control over each component being part of a full set of a virtual platform and combine/link that mean of control with blockchain technology by the means of transactions and states.

With the combination of blockchain technologies and virtual platform binary interception interfaces and features from Imperas, a secure by design pure SW representation may be created into the cloud of any piece of HW and SW running on it as shown in FIGS. 1 and 2.

Figure 6:
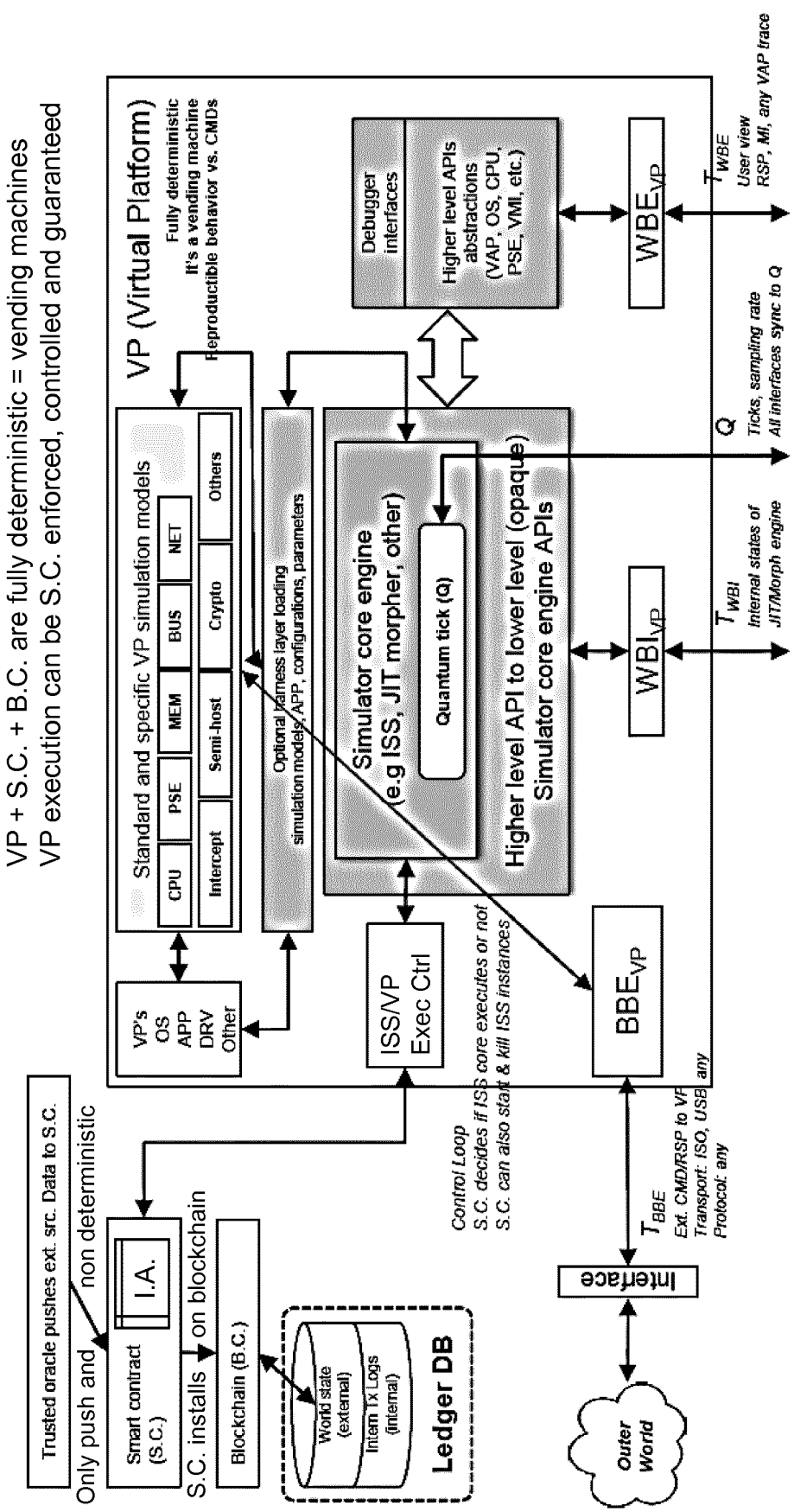
FIG. 6 shows an exemplary virtual platform system linked to a blockchain.

FIG. 6 shows an example of how the transactions shown in FIG. 5 may be processed into a blockchain from the viewpoint of the App.elf part. In the example of FIG. 6 a classic smartcard is virtualized into the cloud-based system. The smartcard application may be configured to perform one or more of the following: boot through several stages one enforcing the next one, getting and consuming rights, manipulate (doing transactions) key and right DBs (DataBases), do cryptographic operations. These operations are transactions processing the underlying virtual platform from one state to another state, which may be observed on application level (App.elf), on CPU models level, on PSE models level, and/or hosted code level. The three main interception interfaces (CPU, PSE, Application) may detect all state changes and most of all can control the state changes, resulting in the execution flow being enforceable using blockchains.

A wallet or several wallets may be associated with the virtual platform, each wallet by definition being separated cryptographically (different PPK pairs). A wallet may be the counter-piece in front of a blockchain network. When interacting with a blockchain network, a wallet may be needed.

Each functional part of the virtual platform, such as shown in FIG. 4, may trade its values with a higher-level entity and blockchain network. Herein, values may be counters, points, units, et cetera. Different wallets may be associated to CPU model, PSE model, the application itself and/or the VMI APIs shown in FIG. 5. The wallet may be seen as "values" each entity can spend and work with, or in/out transactions pointing to/from the wallet. This also means the intercept libraries and more generally each functional block (FIG. 4) may need to be extending to blockchain functionalities with for example a thin client code block that may provide the so-called wallet functionalities counter piece.

It may be defined how fine grained a transaction is and at which frequency it may be invoked, dixid "what" a transaction is, its value, format and how to quickly to perform hashing.

Transactions that may be processed by a blockchain are not limited to transactions occurring between basic blocks of a virtual platform such as shown in FIG. 3. For example, static data such as the interception libraries themselves, the simulation models themselves and/or all the FSM (Final State Machines) of each simulation model DLL and associated interception libraries may be processed by a blockchain. Inside an FSM changing states may be considered as micro-transactions or state changes that may be enforced by a blockchain. Each simulation model of any kind typically has to forward-execute in a secured from tampering and revision, public and non-reputable manner.

In the example of FIG. 5 one instance of a virtual platform is shown. The disclosure is not limited to one such instance, but may be used with many, even millions of those instances. With multiple instances, CPU models of multiple or all virtual platform instances may be linked together into a large blockchain. Similarly, multiple or all PSE models of all virtual platforms and/or application ELFs and VMI interfaces may be linked into a large blockchain. The blockchain may be segmented into other blockchain organizations. Parts of a virtual platform may be executed on a given node and the rest on another node, both nodes being part of a same or different blockchain network. Blockchains may be hierarchically layered combining permissionless blockchains and/or permissioned blockchains. Permissionless blockchains may enable P2P exchange between user part of a controlled blockchain network, wherein the control is being given by the permissioned blockchain where typically only few endorsed and trusted parties can join. The permissioned blockchain may modify and enforce rules and configurations of the whole system.

FIG. 6 shows an exemplary virtual platform system, which may be implemented based on a cloud-based system as shown in FIG. 2. The virtual platform system of FIG. 6 includes a simulator core engine (e.g. an ISS or JIT morpher), similar to item 5 in FIG. 2. The simulator core engine may be configured to communicate with a debugger interface, similar to item 8 in FIG. 2, via an API. The simulator core engine may be configured to communicate with a blockchain via the execution controller element depicted ISS/VP Exec Ctrl. The blockchain may be governed by a smart contract S.C. that may include an intangible assets table I.A. The blockchain typically makes use of a distributed ledger database.

The virtual platform of FIG. 6 further includes standard and/or specific VP simulation modules, such as models for CPU, PSE, MEM, BUS, NET, intercept interfaces, semihost interfaces, and/or crypto interfaces or processors. The VP simulation modules may be similar to item 4a and/or item 6 in FIG. 2.

The VP's OS, APP, DRV communicates with the VP simulation modules and the simulation core engine, possibly via a harness layer for loading simulation modules, APP, configurations and/or parameters. The VP's OS, APP, DRV part may be similar to item 9 and/or item 10 in FIG. 2.

Transactions may be captured through various interfaces. $BBE_{VP}$ depicts interception of transactions related to external hardware that has been virtualized. The $BBE_{VP}$ interface links for example to the semi-host in the VP simulation models element. Herein BBE stands for black box external, because the transaction interception is considered a black box interception and the transactions concern elements external to the virtual platform. $WBI_{VP}$ depicts interception of events related to the simulator core engine. Herein WBI stands for white box internal, because the transaction interception is considered a white box interception and the transactions concern elements internal to the virtual platform. $WBE_{VP}$ depicts interception of events related to the debugger interface. Herein WBE stands for white box external, because the transaction interception is considered a white box interception and the transactions concern elements external to the virtual platform.

Before the execution of the virtual platform is enforced, the intangible assets table I.A. may be created in a training phase. In the training phase predefined command/response (CMD/RSP) transaction events are played and captured by simulating an external device on the external or $BBE_{VP}$ interface. Preferably all possible command/response pairs that may be executed on the virtual platform are predetermined. The predetermined command/response pairs may be played and their corresponding transaction events captured to create the intangible assets table. The intangible assets table may then be used to ensure that full VP execution can be enforced, controlled and guaranteed by the smart contract and the blockchain when the virtual platform is in use. The training phase is typically performed offline, meaning that the virtual platform need not be connected to external clients during the training phase.

One CMD/RSP pair may include multiple events that are executed at deterministic subsequent moments in time. In FIG. 7 two CMD/RSP pairs CMD-RSP A and CMD-RSP B are shown. Events are show in the rows of FIG. 7. Small letter "t" denotes an event at a moment in time that is executed for command CMD-A or CMD-B or for response RSP-A or RSP-B. One column in FIG. 7 includes the events as captured on an interface BBE, WBI or WBE, the events together denoted capital "T" to indicate that is covers multiple moments in time.

As shown in FIG. 7, each TBBE CMD/RSP pair may have subsets of transactions captured on the WBI and WBE interface. FIG. 7 also shows a column Q, which indicates a quantum tick Q that may be generated in a quantum tick generator of the simulator core engine as shown in FIG. 6. The quantum tick Q may be used as a relative internal clock value or timing value for time labeling the events. Q may be the synchronizing element of all transactions and may be implemented as an internal ISS sampling counter. The total execution time for a CMD/RSP pair may be calculated by deducting the last tick from the first tick of the CMD/RSP pair. For CMD-RSP A this results in a total execution time $t_P$ of $q_{o(A)}-q_{P(A)}$.

The sampling rate of the quantum tick Q may be set to different rates, meaning that the number of ticks per second may be varied. A higher sampling rate typically results in a higher level of security as more transaction events may be captured and verified per Q sampling window, but typically results in a higher required processing power. A lower sampling rate typically results in a lower level of security as less transaction events may be captured and verified per Q sampling window, but typically results in a lower required processing power.

The intangible assets table I.A. may be generated from the table of FIG. 7 as shown in FIG. 8. It will be understood that FIGS. 7 and 8 are exemplary and that a similar I.A. table may be generated in alternative manners. As shown in FIG. 8, for each CMD/RSP pair the captured events as captured from the different interfaces may be transformed into intangible assets by performing a hashing function on the event identifier. For example, the event $t_{BBE}^{CMD-A}$ may be hashed into hash value $h_{CMD-A}$. For one Q tick moment in time the events captured on the different interfaces may thus be hashed and the Q tick value may be hashed. Each class of transactions ($T_{BBE}$, $T_{WBI}$, $T_{WBE}$) may thus be hashed. As shown in FIG. 8, the obtained has values may further be hashed into a global hash $H^{o(A)}$, which is the global hash of CMD-RSP A that stats at Q tick value $q_{o(A)}$ shown in FIG. 7.

For one CMD/RSP pair all events for all Q tick values may thus be hashed to obtain the I.A. table, an example of which is shown in FIG. 9.

When the virtual platform is in operation, the I.A. table as build during the training phase may be used to secure the operation of the virtual platform. In operation, a $T_{BBE}$ CMD may be detected entering the virtual platform via the external interface shown in FIG. 6, depicted Interface. The ISS/VP Exec Ctrl module may contact the smart contract S.C. of the blockchain the compare the CMD with prestored commands in the I.A. table before allowing the CMD to be executed. The Q time references corresponding to the $T_{BBE}$ CMD in the I.A. table may be extracted and checked. The hash $h_{CMD}$ of the detected event may be computed and checked by comparison with the hash in the I.A. table. The hash of $t_{WBI}$, $t_{WBE}$ and q for each sample of Q may be computed and checked against the stored hashed in the I.A. table. This may be done similarly for the RSP command that would follow the CMD. The overall hash for a detected CMD/RSP pair may then be calculated and compared with hash value in the I.A. table.

If the blockchain approves the CMD/RSP pair, then the ISS/VP Exec Ctrl module may allow the CMD to be executed in the virtual platform by the simulator core engine. The ISS/VP may be allowed to execute until the next Q sample and be required to restart the verification process for the next q. The ISS/VP may be killed and restarted in case the smart contract found an inconsistency between the CMD or CMD/RSP pair as detected by the Interface and stored in the I.A. table.

In the above examples a blockchain is used to verify the detected CMD or CMD/RSP pair against trained or prestored CMD or CMD/RSP pairs. Although less preferred, it is possible to implement the I.A. table in any other manner not using a blockchain. For example, the I.A. table may be implemented on a server hosting the I.A. table for verifying the detected CMDs and RSPs on the Interface before execution by the virtual platform.

The following describes an alternative use case of the system and platform described in FIGS. 1-9. This exemplary alternative use case is related to cybersecurity and network forensics, which typically makes use of two main techniques (among others): IDPS (network intrusion detection and prevention system) and honeypots. Generally, both of these techniques may be complementary and are typically used together. The system and platform of this disclosure may be used to attract then lure an attacker or a botnet into a prepared setup. Actions performed by the attacker can be analyzed, as well as tools and techniques that are used by the attacker. In this embodiment, the virtual platform may thus operate as a honeypot that is set up to have an attacker enter the platform. With the knowledge gained about the actions, tools and/or techniques of the attacker, the system and virtual platform as described in FIGS. 1-9 may be improved or patched to counter similar future attacks on the virtual platform that is not used as honeypot. The virtual platform may include a system that automatically generates code to patch the platform for mitigating the detected attack.

The exemplary system and exemplary virtual platform described with the FIGS. 1-9 is typically used to enforce and guarantee that the virtual platform executes as it is supposed to under normal circumstances and when not being under attack by using smart contracts and transaction hash tables. Such environment is very suitable for realizing e.g. an automate, vending machine or more commonly ATM. In this alternative use case the virtual platform operates as honeypot. The smart contracts may be used as a backend that collects proofs of the (faulty) transactions due to the attacker attempting to get control over the virtual platform and on its top running application. For this alternative use case, the system and platform described in FIGS. 1-9 may be expanded by a training system and a patch generation system.

Reference hashes and an intangible assets table as described with FIGS. 7-9 may be generated with this alternative use case as well, but the virtual platform running as honeypot it is typically allowed to run freely without checking the commands and responses before executing as it aims to capture faulty transactions and erroneous transactions directly linked to the attacker's actions. As a result, in this alternative use case the control loop between the smart contract and the virtual platform may be disabled or removed. The smart contract may then be used to compare the actions of the attacker with the allowed actions to determine whether an attack is being performed. The transactions of the attacker (the faulty transactions and possibly also the allowed transactions) may be stored into the blockchain ledgers for later use, e.g. as proof of the attack or to read back the performed attack.

The alternative use case is particular suitable for use in an Internet of Things (IoT) environment. Today, most commonly used approach for detecting attackers is to set up honeypots using real servers, real HW, real stacks and OSes to ensure an attacker will be lured, while making it difficult for the attacker to detect that he enters a prepared honeypot infrastructure. It has been found that setting up a farm of honeypot machines using real servers and real application software and OSes is time intensive, costs money, needs careful setup and hardly scales out due to its inherent and implicit cost in time and money and real (HW) servers to deploy. Moreover, classic honeypot farm setups typically target classic cloud provider services such as file servers and databases, but are difficult to address end point or leaf devices such as home routers, set top boxes, and etcetera, or IoT devices, in particular smaller IoT devices such as a sensor. Such devices are hard to protect directly and are very popular for massive attacks like botnets.

Virtual platforms may be deployed that reproduce end point, leaf and/or IoT devices. The virtual platforms may be deployed in large numbers if needed, as they can typically be created, updated or destroyed in a glimpse at nearly no cost. The costs are typically limited to creating a copy of real devices as virtual platform replicas. Virtual platform based end point, leaf and/or IoT devices may be deployed into the field directly and these honeypot devices may be inter-mixed with other real in field deployed devices.

The system and virtual platform of the alternative use case may be based on one or more of the following characteristics: (1) use VP+BC+SC concepts; (2) instead of forcing the SC to ensure the VP exactly executes as defined per training phase and I.A. reference hash table over Q rather let it freely run, the SC only takes also the faulty traces and transactions not supposed to happen and puts them into the ledger; (3) gathering also the faulty transactions and not only letting pass and check correct and supposed to happen ones is interesting; (4) what goes into ledger can legally be used later as a solid, consistent proof and evidence; (5) the SC uses its trained I.A. table as the reference for OK transactions; (6) the SC captures also the not-OK transactions and can diff those vs. the OK ones thanks to the I.A. table; (7) the SC no longer enforces (loop back) the VP execution; (8) the SC may enforce the VP execution only for very specific use cases, e.g. to keep a minimum integrity of the VP being under attack and not let the attacker completely destroy and understand it—in such case the SC may decide to kill the VP and restart a new fresh VP instance (that could be a copy of the previous one with same IDs and code being loaded to remain undetected—e.g. it must look like a simple reboot of the same device running same code); (9) the VP may be equivalent to real HW and SW running on it so attacker cannot differentiate if it's a real device or a VP backed by a SC; (10) the VP runs production grade (or part of production) application code and OSes; (11) the VP freely runs and is not constraint by SC letting do the attacker to it what he wants; (12) the VP preferably runs at least at the same speed as the real HW target (e.g. an IoT end/leaf device); (13) the VP may run faster or slower as real HW where it's appropriate for certain purpose; (14) the VP interception may vary in granularity (impacts I.A. table size hence speed of execution)—e.g. the Q factor or sampling rate of the intercept routines may be varied; (15) the VP interception has complete view over the VP simulation model execution, semi-host calls and interactions, application and OSes running on top of the VP itself; (16) the VP may show consistent timing toward the attacker but may vary it if real HW devices also do this in real life; (17) the VP may fully trace each single bit and transaction (memory, registers, application) silently and underneath, attacker will not see anything thanks to advanced binary interception; (18) the VP traces may serve to reverse engineer attacker code that attempt and successfully succeeded in modifying the VP and its application; (19) the VP may not need very special protection (like a hardened OS or real server machine) but is preferably seen as a simple process to protect—this may be let to host machine/OS instead (e.g. to keep around running real IT infrastructure integrity intact—or sand boxing); (20) the VP may be considered being part of process VM family hence may run inside another so-called system VM family (e.g. VMWare or ESX hypervisor classes); (21) the system may scale at will; (22) the system may adapt at will; (23) the system may behave at will; (24) the system may be shut down and (re)created at will based on external trigger logic; (25) the system may record all transactions (if fast enough), which may be replayed later; (26) the system may be realized as a farm being mixed under real HW devices directly connected (preferably with no delays) to a WAN, possibly over a layer 2 VPN to create a basic sandboxing layer; (27) mixing virtual and real devices preferably makes it impossible for an attacker to detect whether the device is a real HW device or a prepared VP one; (28) the system farm composed of VPs may be of rolling nature where VPs can be changed regularly with bug fixes, better monitoring, and etcetera; (29) real APP and OSes may run on a 100% ABI compatible system, or slightly modified APPs may run on the VP; (30) real nature of the VP is typically obfuscated; (31) semi-hosting using real HW resources (e.g. UART, USB, Ethernet, sockets, services) like QEMU may be applied.

The alternative use case may be based on the same architecture as shown in FIG. 6. Different from the use case described with FIG. 6, in the alternative use case the link between the Intangible Assets table I.A. and the ISS/VP Exec Ctrl box is typically not used to enable the smart contract hosting the I.A. to put constrains on the virtual platform execution.

As explained above, the virtual platform may be allowed to run "freely" from an attacker's perspective. However, the virtual platform typically remains fully monitored through one or more, preferably all of its three main monitoring interfaces BBE, WBI and WBE in such a way this will not impact the execution of the virtual platform itself, top running application or OSes. Hence, what happens to an attacked virtual platform running as a honeypot may be monitored, and if an attacker breaks the VP or makes it crash, the virtual platform may be restarted. Restarting a VP may be performed in a random fashion, e.g. the boot time may be artificially varied to make it appear more real. Preferably, every transaction and move on the virtual platform is monitored to give full insight and traces for post-mortem analysis. This information may be hashed (e.g. into intangible assets as described with FIGS. 7-9) and sent to a smart contract back-end that may trace not only the good but especially the bad transactions resulting from the attackers moves and attempts to e.g. get control over the virtual platform. In that way legally usable proofs may be collected that an attack happened, ideally assorted with a post-mortem analysis and all transaction traces the virtual platform collected during attack phase.

A match to a known attacker or well know attack pattern may directly or indirectly lead to a person or organization against whom legal actions can be undertaken based on the smart contract-based proofs and evidences.

Figure 10:
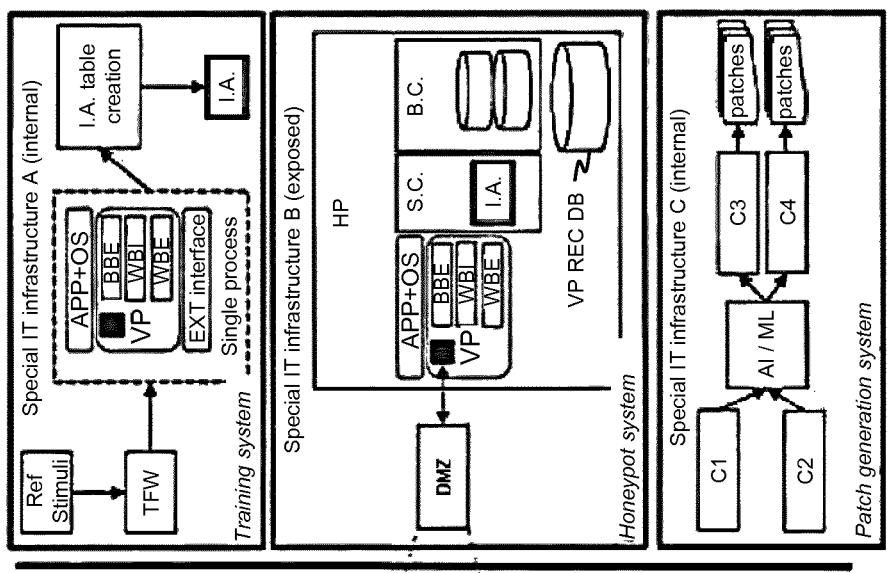
FIG. 10 shows a system architecture of a deployment example for an alternative use case.
Figure 10:
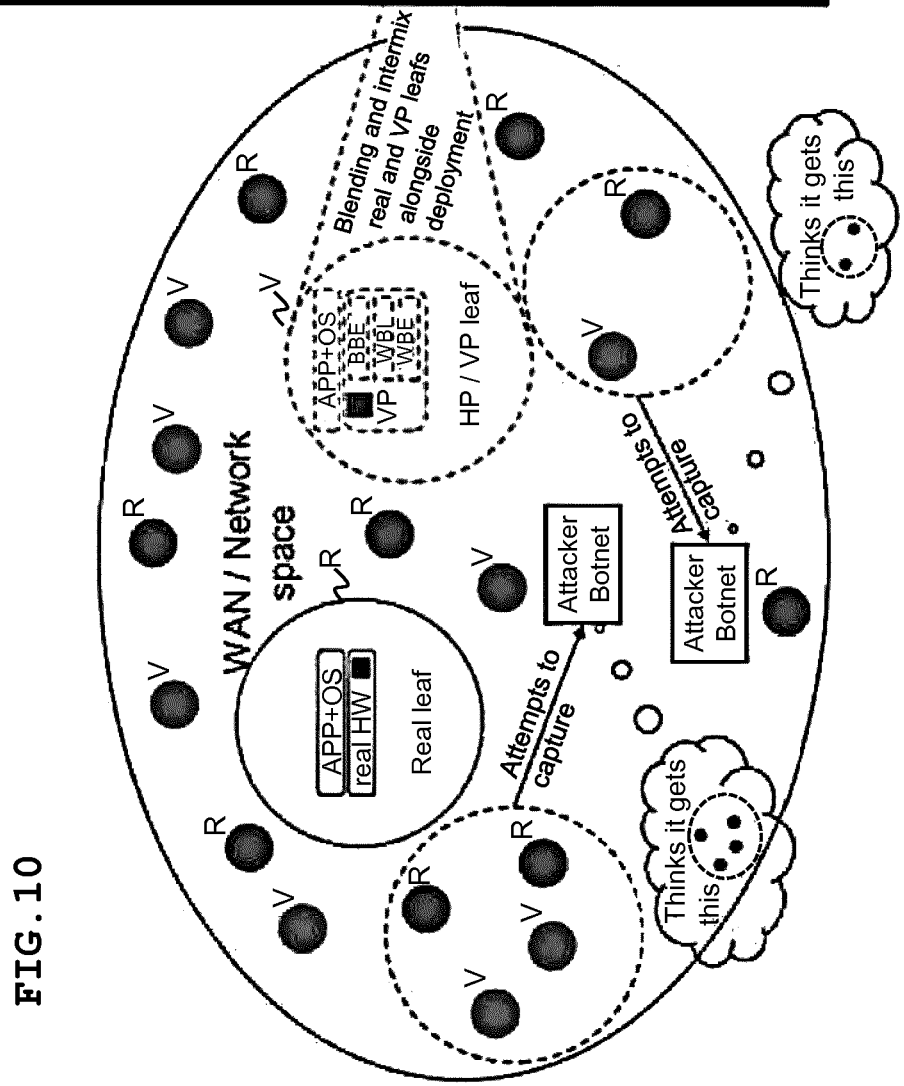

FIG. 10 shows a deployment example for the alternative use case. On the left side, a WAN (Wide Area Network) such as the Internet is shown that includes a cloud infrastructure, IoT devices, and one or more attackers and/or botnets trying to capture valuable IoT devices. Points and circles referenced "R" represent real end point or leaf devices, IOT devices, smart appliance, home automation devices, sensors of any kind, routers, etcetera, i.e. any real world HW running real applications, firmware and/or OSes. Points and circles referenced "V" represent virtual platform versions (and luring) devices.

Let's assume that an attacker wants to capture a maximum of the real R and virtual V items. The attacker is typically not aware that there are two kind of items, real devices R and the virtual platform based devices V being emulated and blended into the network space among the real devices R. The mix between R and V items may be chosen such that statistically the attacker gets both items by more or less the same amount and will start attacking not only the real R but also the virtual V items.

Figure 11:
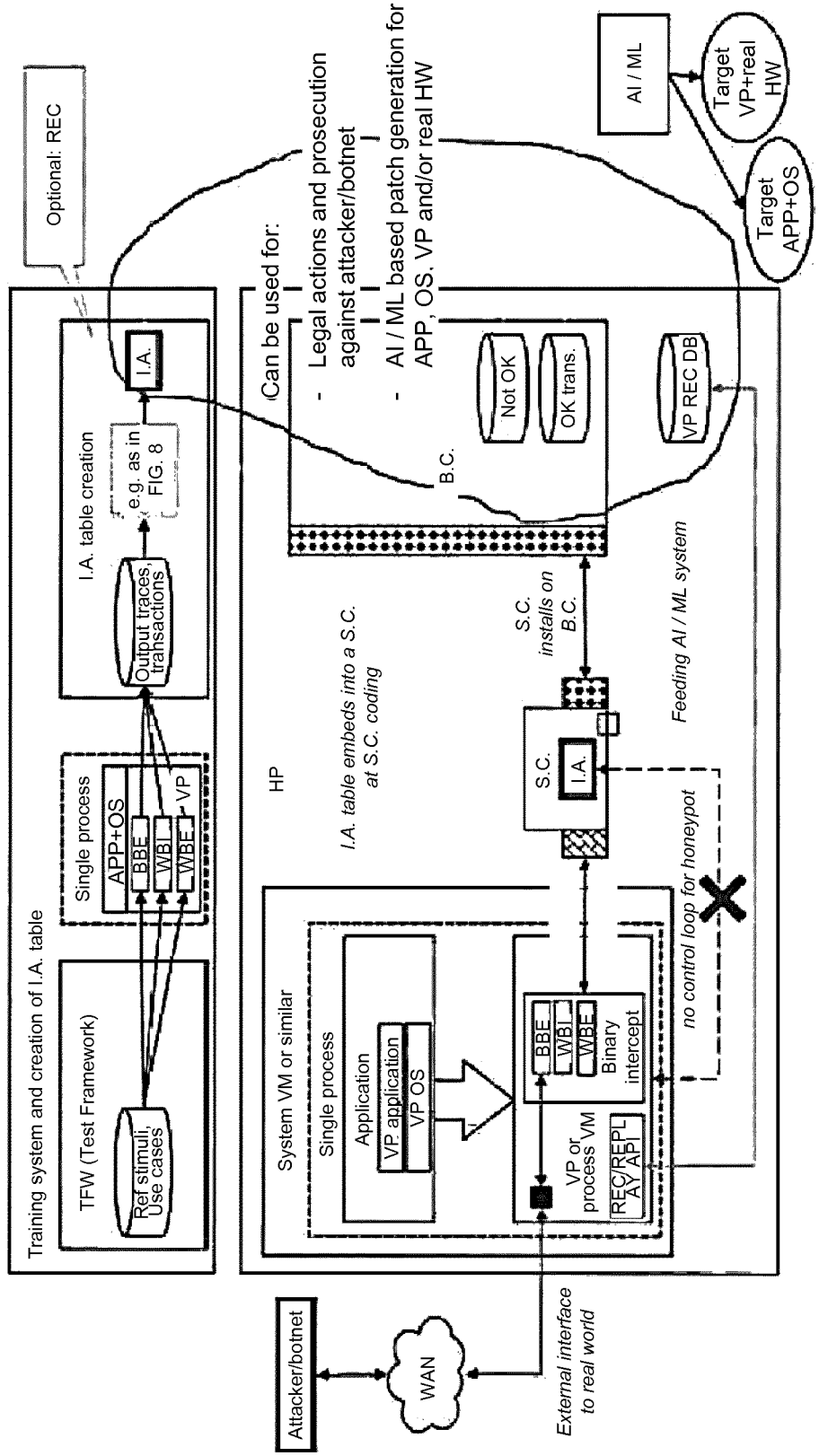
FIG. 11 shows a part of the system architecture of FIG. 10 in more detail.

On the right side three parts are shown that may run in isolation, not being interconnected. Data transmission between the three parts, where necessary, may be carried out by humans to eliminate the possibility of eavesdropping data traffic. Alternatively but less preferred, data transfer between the three parts may be possible, preferably in an encrypted manner. FIG. 11 shows a more detailed view of the three parts on the right side of FIG. 10.

Special IT infrastructure A may include a training system to produce reference I.A. table, special IT infrastructure B may include a honeypot system, typically including virtual platform VP, smart contract S.C. and blockchain B.C., and special IT infrastructure C may include an automated artificial intelligence AI and/or machine learning ML patch code generation system targeting HW+SW parts. C1 represents traces—preferably all traces—from the HP/VP platform of the special IT infrastructure B. C2 represents traces—preferably all traces—from the test framework TFW of the special IT infrastructure A. C3 represents the targeting APP+OS. C4 represents the targeting VP and real HW.

The training system may generate the reference Intangible Assets I.A. reference table. This may be done using a test framework capable to create and capture any stimuli targeting the virtual platform VP and application and OSes running on top of the VP. Business cases may be coded as tests which will result in stimuli. Virtual platform traces, preferably all traces, undergoing such stimuli storm may be captured back and then sequenced and transformed into a I.A. table that may be the reference sequence of the virtual platform, similar to as explained with FIGS. 7-9. Such I.A. table(s) is(are) may then be loaded later into the smart contract logic.

The honeypot system part may be composed of one or more, preferably all four, of the following components:

(1). A general and specially prepped and protected IT infrastructure (e.g. a DMZ a shown in FIG. 10) which may include other protective and watching items such as firewalls, IDPS and such.

(2). A victim virtual platform and its application and OSes itself acting as the exposed attack surface. The virtual platform may bring a fully-fledged binary interception layer allowing for up to a 100% monitoring of each single bit moving both on the virtual platform simulation models (representing real IoT HW) and the on top running application and OSes codes. The interception layers may connect to the smart contract backend and get hashed there in sequence prior getting compared to the I.A. also part of the smart contract. Hashing typically occurs in the smart contract and not the virtual platform itself being under attack. The virtual platform, aside the smart contract itself, may also create traces by itself represented by the database 'VP REC DB'. This VP REC DB database is typically not forcibly linked to the I.A. and smart contract and may be an alternative channel to collect evidence.

(3). A smart contract backend training system containing the I.A. as a reference how the platform executes if not under attack; the smart contracts typically installs/mounts on a blockchain and can diff out good and bad transactions thanks to the reference I.A. it is in possession of.

(4). A blockchain B.C. backend, which is preferably private and permissioned, with its ledgers—in the example of FIG. 10 depicted by the two databases in the B.C. block as one for the good and one for the bad transactions being fed by the smart contract.

All collected data after an attack against a victim virtual platform (in blockchain ledgers, other databases and the I.A. itself) may serve for legal prosecution and real evidence. Those traces not only can serve legal but also post-mortem purpose such as to enable creation and proposing of patches. The whole system may thus prove itself (internally) first prior getting deployed as described above against real (reference) HW platforms and devices the virtual platform is supposed to represent.

For a high enough virtual platform binary interception sampling rate Q, it is possible to get very high quality and nearly cycle-accurate diffs what exactly happened during attack at each level: virtual platform HW emulation but also application and OSes and external interactions (aka semi-hosting or virtual platform communication to its external world represented by small green boxes and arrows).

Being in possession of such high-quality information it is possible to generate patches accordingly using ML/AI to push to its outmost the automation. Patches may therefore be generated both for the HW and the SW. Deployment of such patches is preferably deployed in a timely fashion, but preferably not too quick to not alert the attacker that he is being monitored. This is especially true for a virtual platform patch, for which is may be decided to keep it open for a longer time until the attacker thinks he got it all now and only then update/patch the virtual platform.

Figure 12:
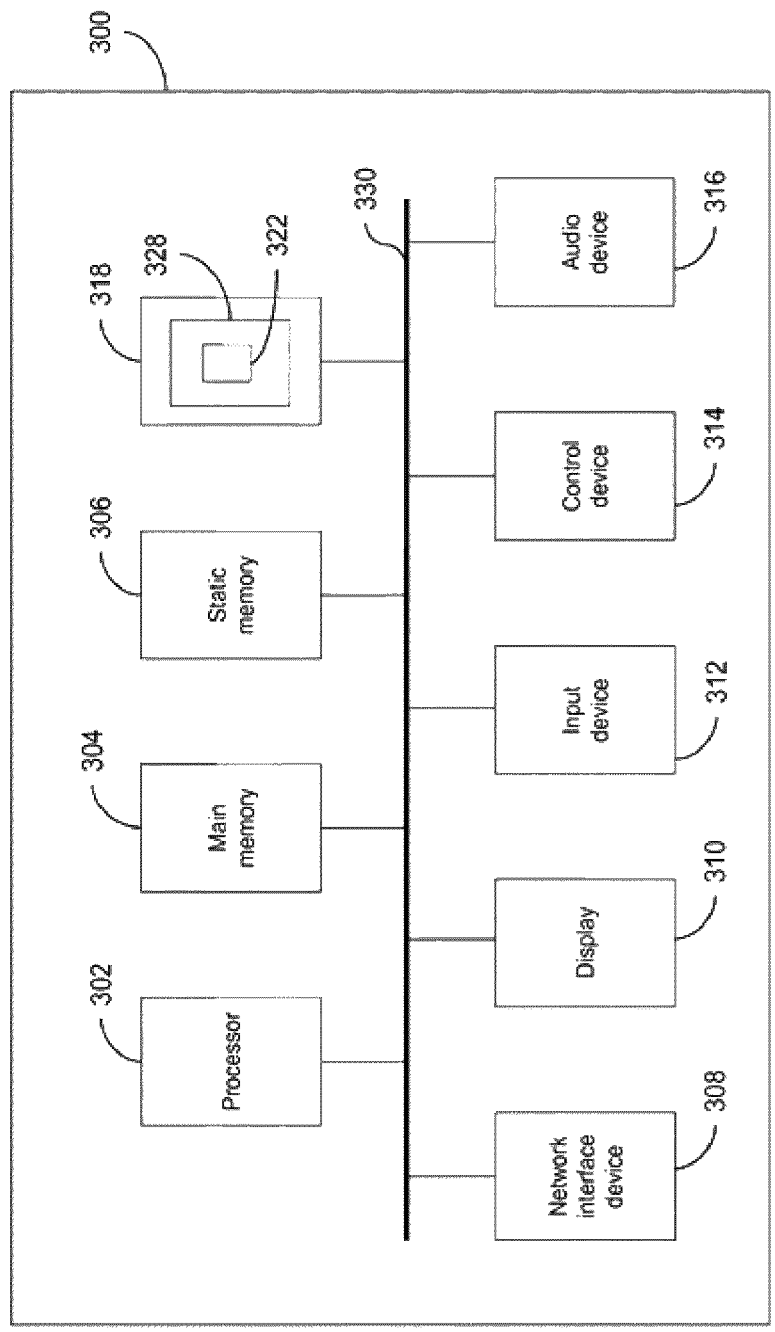
FIG. 12 illustrates a block diagram of one implementation of a computing device.

FIG. 12 illustrates a block diagram of one implementation of a computing device 300 within which a set of instructions, for causing the computing device to perform any one or more of the methodologies discussed herein, may be executed. The computing device 300 may be used for elements of the system shown in FIGS. 1-6 and FIGS. 10-11.

In alternative implementations, the computing device may be connected (e.g., networked) to other machines in a Local Area Network (LAN), an intranet, an extranet, or the Internet. The computing device may operate in the capacity of a server or a client machine in a client server network environment, or as a peer machine in a peer-to-peer (or distributed) network environment.

The computing device may be a personal computer (PC), a tablet computer, a set-top box (STB), a wearable computing device, a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single computing device is illustrated, the term "computing device" shall also be taken to include any collection of machines (e.g., computers) that individually or jointly execute a set (or multiple sets) of instructions to perform any one or more of the methodologies discussed herein.

The example computing device 300 includes a processing device 302, a main memory 304 (e.g., read-only memory (ROM), flash memory, dynamic random access memory (DRAM) such as synchronous DRAM (SDRAM) or Rambus DRAM (RDRAM), etc.), a static memory 306 (e.g., flash memory, static random access memory (SRAM), etc.), and a secondary memory (e.g., a data storage device 318), which communicate with each other via a bus 330.

Processing device 302 represents one or more general-purpose processors such as a microprocessor, central processing unit, or the like. More particularly, the processing device 302 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 302 may also be one or more special-purpose processing devices such as an application specific integrated circuit (ASIC), a field programmable gate array (FPGA), a digital signal processor (DSP), network processor, or the like. Processing device 302 is configured to execute the processing logic (instructions 322) for performing the operations and steps discussed herein.

The computing device 300 may further include a network interface device 308. The computing device 300 also may include a video display unit 310 (e.g., a liquid crystal display (LCD) or a cathode ray tube (CRT)), an alphanumeric input device 312 (e.g., a keyboard or touchscreen), a cursor control device 314 (e.g., a mouse or touchscreen), and an audio device 316 (e.g., a speaker).

The data storage device 318 may include one or more machine-readable storage media (or more specifically one or more non-transitory computer-readable storage media 328) on which is stored one or more sets of instructions 322 embodying any one or more of the methodologies or functions described herein. The instructions 322 may also reside, completely or at least partially, within the main memory 304 and/or within the processing device 302 during execution thereof by the computing device 300, the main memory 304 and the processing device 302 also constituting computer-readable storage media.

The various methods described above may be implemented by a computer program. The computer program may include computer code arranged to instruct a computer to perform the functions of one or more of the various methods described above. The computer program and/or the code for performing such methods may be provided to an apparatus, such as a computer, on one or more computer readable media or, more generally, a computer program product. The computer readable media may be transitory or non-transitory. The one or more computer readable media could be, for example, an electronic, magnetic, optical, electromagnetic, infrared, or semiconductor system, or a propagation medium for data transmission, for example for downloading the code over the Internet. Alternatively, the one or more computer readable media could take the form of one or more physical computer readable media such as semiconductor or solid state memory, magnetic tape, a removable computer diskette, a random access memory (RAM), a read-only memory (ROM), a rigid magnetic disc, and an optical disk, such as a CD-ROM, CD-R/W or DVD.

In an implementation, the modules, components and other features described herein (for example control unit 310 in relation to FIG. 12) can be implemented as discrete components or integrated in the functionality of hardware components such as ASICS, FPGAs, DSPs or similar devices as part of an individualization server.

A "hardware component" is a tangible (e.g., non-transitory) physical component (e.g., a set of one or more processors) capable of performing certain operations and may be configured or arranged in a certain physical manner. A hardware component may include dedicated circuitry or logic that is permanently configured to perform certain operations. A hardware component may be or include a special-purpose processor, such as a field programmable gate array (FPGA) or an ASIC. A hardware component may also include programmable logic or circuitry that is temporarily configured by software to perform certain operations.

Accordingly, the phrase "hardware component" should be understood to encompass a tangible entity that may be physically constructed, permanently configured (e.g., hardwired), or temporarily configured (e.g., programmed) to operate in a certain manner or to perform certain operations described herein.

In addition, the modules and components can be implemented as firmware or functional circuitry within hardware devices. Further, the modules and components can be implemented in any combination of hardware devices and software components, or only in software (e.g., code stored or otherwise embodied in a machine-readable medium or in a transmission medium).

The invention claimed is:

1. A virtual platform system for use in a cloud-based system, the virtual platform system comprising:
   a virtual platform simulator configured to represent in software at least a part of a physical remote client device, the virtual platform simulator further configured to have the at least part of the physical remote client device that is represented in software interact with a virtual platform application;
a process virtual machine configured to execute program instructions of the virtual platform application, the process virtual machine comprising a code morpher component configured to transform the program instructions of the virtual platform application into native program instructions for execution on a physical host machine of the cloud-based system; and
one or more interception components configured to capture transactions from at least one of the virtual platform simulator or the process virtual machine, wherein the transactions are related to the execution of the program instructions of the virtual platform application,
wherein the virtual platform system is configured to:
verify a transaction of the captured transactions based on a comparison of the transaction with a command-response pair recorded by the one or more interception components based on a simulated external device; and
allow the execution of the program instructions based on the verification of the transaction.

2. The virtual platform system according to claim 1, wherein the captured transactions comprise first transactions captured from the virtual platform simulator by a first interception component, and wherein the first transactions include at least one of:
a semihost transaction that is used on the physical host machine, such as file I/O or pipes related commands or responses;
a semihost transaction that leaves the physical host machine for transmission to the physical remote client device, such as USB, Ethernet or UART related commands or responses; or
a transaction from behavioral, functional or semi-hosting parts.

3. The virtual platform system according to claim 1, wherein the captured transactions comprise second transactions captured from the process virtual machine by a second interception component, wherein the second transactions include virtual machine internal transactions, states and/or logs, the second transactions being related to at least one of: a simulator core engine; the code morpher component; a compiler; runtimes; or interfaces.

4. The virtual platform system according to claim 3, further comprising a debugger interface comprising a third interception component, wherein the captured transactions comprise third transactions captured from the process virtual machine by the third interception component, wherein the third transactions include virtual machine external transactions, states and/or logs, the third transactions being related to at least one of: a used CPU; a used peripheral; a used computer bus; a used computer memory; a used operating system; an output from a verification, analysis and profiling module; or debugger traces.

5. The virtual platform system according to claim 1, wherein the captured transactions are linked to a timing reference, such as a tick from a quantum tick component of the process virtual machine, wherein multiple related captured transactions are grouped by the timing reference to obtain a group of captured transactions, and wherein the group of captured transactions is compared with a pre-stored group of transactions to verify the group of captured transactions.

6. The virtual platform system according to claim 5, wherein the timing reference is set according to a sampling rate, wherein a higher sampling rate results in a higher number of transactions in the group of captured transactions and in the pre-stored group of transactions, and wherein a lower sampling rate results in a lower number of transactions in the group of captured transactions and in the pre-stored group of transactions.

7. The virtual platform system according to claim 5, wherein the group of captured transactions is related to one command-response pair at the virtual platform simulator of a communication with the physical remote client device.

8. The virtual platform system according to claim 1, wherein the virtual platform system is configured to calculate a hash value of each of the captured transactions, and wherein the virtual platform system is configured to compare the hash values of the captured transactions with pre-stored hash values of the transactions to verify the captured transactions.

9. The virtual platform system according to claim 8, wherein the pre-stored hash values are stored in a smart contract on a blockchain.

10. A method for use in a virtual platform system, the method comprising:
providing a predetermined set of command-response pairs to one or more interception components based on a simulated external device;
recording transaction events related to the predetermined set of command-response pairs to obtain pre-stored transactions;
capturing transactions from at least one of a virtual platform simulator and a process virtual machine of the virtual platform system, wherein the transactions are related to execution of program instructions of a virtual platform application,
verifying a transaction of the captured transactions based on a comparison of the transaction with a command-response pair of the pre-stored transactions; and
allowing the execution of the program instructions based on the verification of the transaction.

11. The method according to claim 10, further comprising calculating a hash value of each of the captured transactions, and comparing the hash values of the captured transactions with pre-stored hash values of the transactions to verify the capture transactions.

12. The method according to claim 11, wherein the pre-stored hash values are stored in a smart contract on a blockchain, and wherein the virtual platform system requests permission from the smart contract for executing the program instructions.

13. A non-transitory computer-readable storage medium having stored thereon instructions that, when executed by at least one processor, cause the at least one processor to:
provide a predetermined set of command-response pairs to one or more interception components based on a simulated external device;
record transaction events related to the predetermined set of command-response pairs to obtain pre-stored transactions;
capture transactions from at least one of a virtual platform simulator and a process virtual machine of a virtual platform system, wherein the transactions are related to execution of program instructions of a virtual platform application,
verify a transaction of the captured transactions based on a comparison of the transaction with a command-response pair of the pre-stored transactions; and allowing the execution of the program instructions based on the verification of the transaction.

\* \* \* \* \*